US009620168B1

(12) United States Patent
Townsend et al.

(10) Patent No.: US 9,620,168 B1
(45) Date of Patent: Apr. 11, 2017

(54) CATALOGING VIDEO AND CREATING VIDEO SUMMARIES

(71) Applicant: Amazon Technologies, Inc., Seattle, WA (US)

(72) Inventors: Matthew Alan Townsend, Redwood City, CA (US); Moshe Bouhnik, Holon (IL); Konstantin Kraimer, Hadera (IL); Eduard Oks, Holon (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/976,192

(22) Filed: Dec. 21, 2015

(51) Int. Cl.
| | |
|---|---|
| *H04N 9/80* | (2006.01) |
| *G11B 27/02* | (2006.01) |
| *G06K 9/00* | (2006.01) |
| *G06K 9/46* | (2006.01) |
| *G06T 7/40* | (2017.01) |
| *G06K 9/52* | (2006.01) |
| *G06T 7/60* | (2017.01) |
| *H04N 5/262* | (2006.01) |
| *G06K 9/62* | (2006.01) |
| *G06T 7/00* | (2017.01) |

(52) U.S. Cl.
CPC .......... *G11B 27/02* (2013.01); *G06K 9/00268* (2013.01); *G06K 9/00751* (2013.01); *G06K 9/4642* (2013.01); *G06K 9/4652* (2013.01); *G06K 9/52* (2013.01); *G06K 9/6201* (2013.01); *G06T 7/0042* (2013.01); *G06T 7/408* (2013.01); *G06T 7/60* (2013.01); *H04N 5/2628* (2013.01); *G06K 2009/4666* (2013.01); *G06T 2207/30168* (2013.01)

(58) Field of Classification Search
CPC .. G11B 27/02; G06K 9/00268; G06K 9/4641; G06K 9/4652; G06T 7/408; G06T 7/60; G06F 17/3079; G06F 17/30831; H05N 5/2628
See application file for complete search history.

(56) References Cited

U.S. PATENT DOCUMENTS

2005/0278740 A1* 12/2005 Helms ................ H04N 7/17336
725/41
2016/0092088 A1* 3/2016 Doyle ................. G06F 3/04847
715/738

* cited by examiner

*Primary Examiner* — Huy T Nguyen
(74) *Attorney, Agent, or Firm* — Seyfarth Shaw LLP; Ilan N. Barzilay; Cyrus A. Miller

(57) ABSTRACT

A system and method for determining video clips including interesting content from video data. The system may receive annotation data identifying time and positions corresponding to objects represented in the video data and the system may determine priority metrics associated with each of the objects. By associating the priority metrics with the time and positions corresponding to the objects, the system may generate a priority metric map indicating a time and position of interesting moments in the video data. The system may generate moments and/or video clips based on the priority metric map. The system may determine a time (e.g., video frames) and/or space (e.g., pixel coordinates) associated with the moments/video clips and may simulate camera motion such as panning and/or zooming with the moments/ video clips. The system may generate a Master Clip Table including the moments, video clips and/or annotation data associated with the moments/video clips.

20 Claims, 33 Drawing Sheets

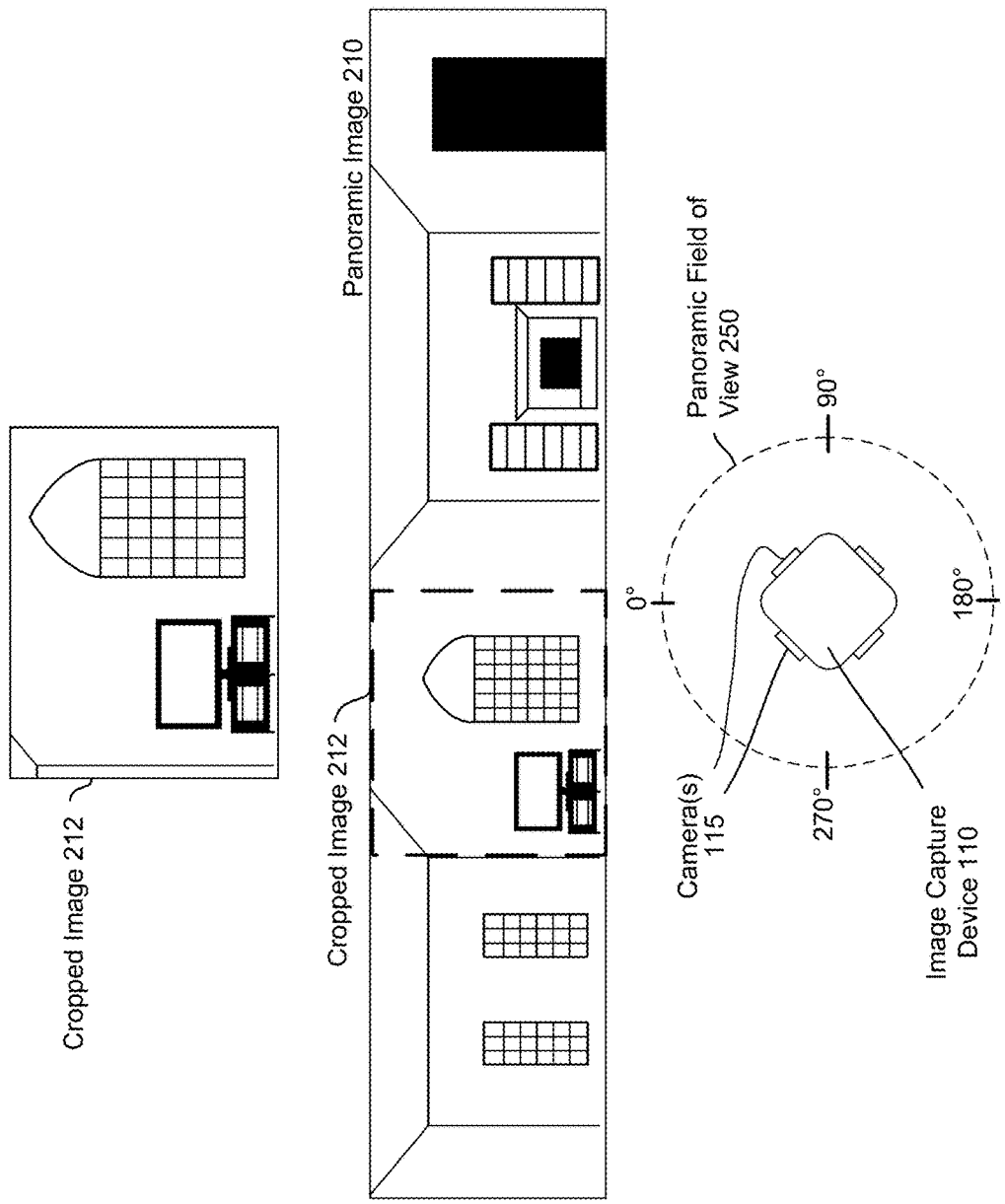

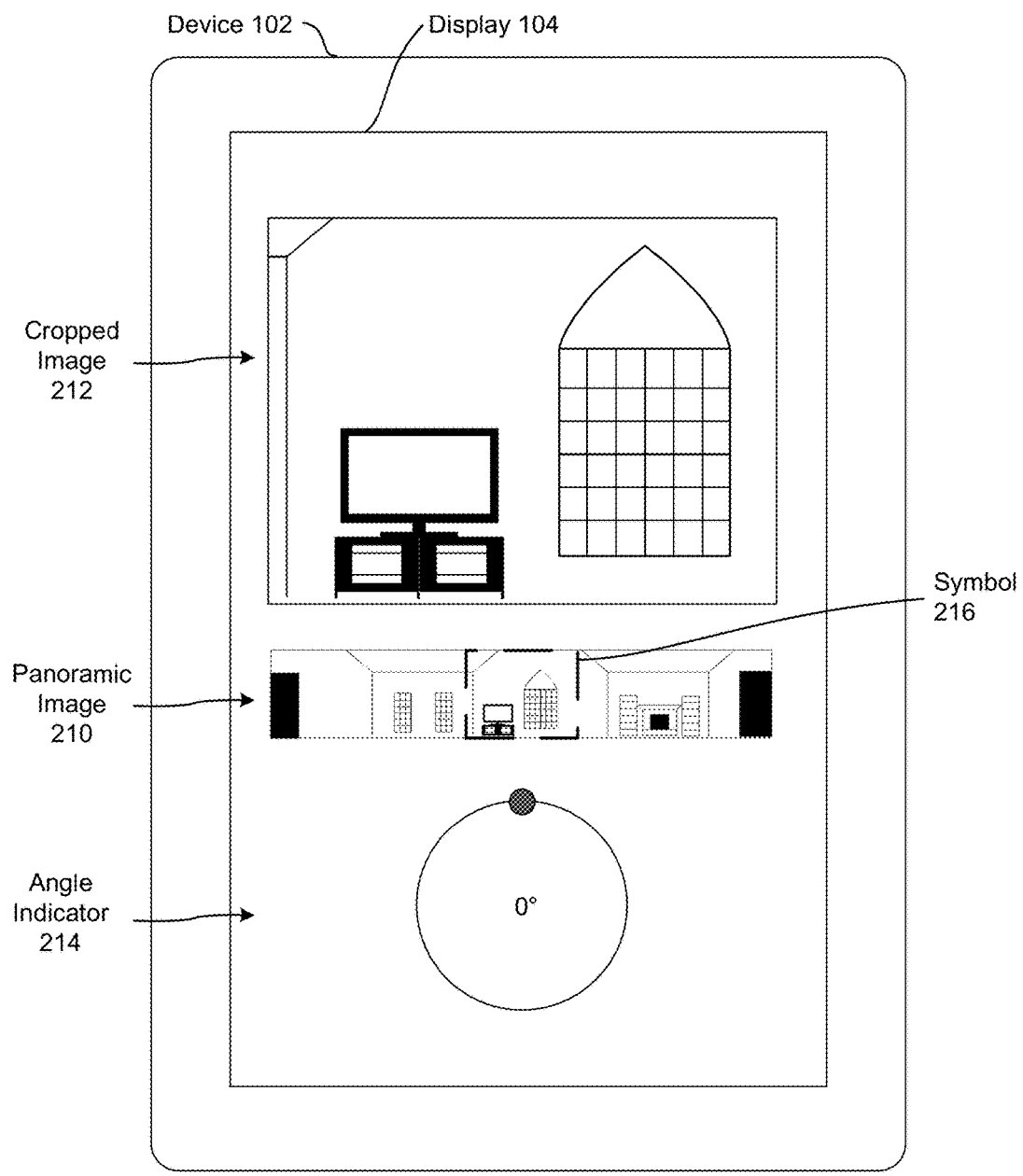

FIG. 5A

| Frame | Time, Location, Motion, Faces, Humans, Scenes, Audio, Landmarks, Objects, Pets, Directional Data, etc. |
|---|---|
| Frame 1 | |
| Frame 2 | |
| Frame 3 | |
| Frame 10 | |
| Frame 11 | |
| Frame 30 | |
| Frame 35 | |

Annotation Database 510

FIG. 5C

| Frame | Priority Metric | Time, Location, Motion, Faces, Humans, Scenes, Audio, Landmarks, Objects, Pets, Directional Data, etc. |
|---|---|---|
| Frames 1-200 | | |
| Frames 350-600 | | |
| Frames 800-1200 | | |
| Frames 1500-1650 | | |
| Frames 2000-2200 | | |
| Frames 2400-2550 | | |
| Summary Data | | |

Annotation Database 514

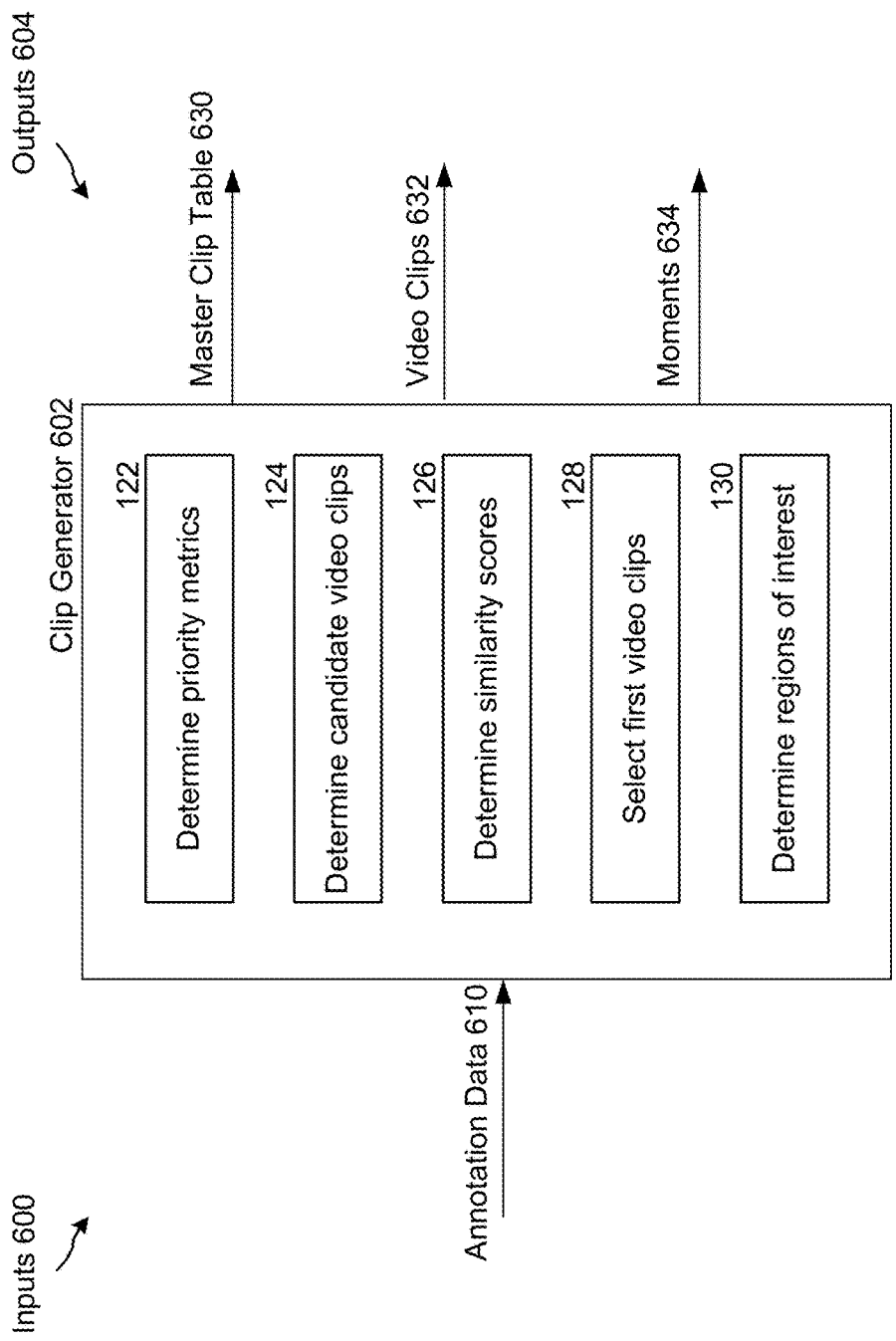

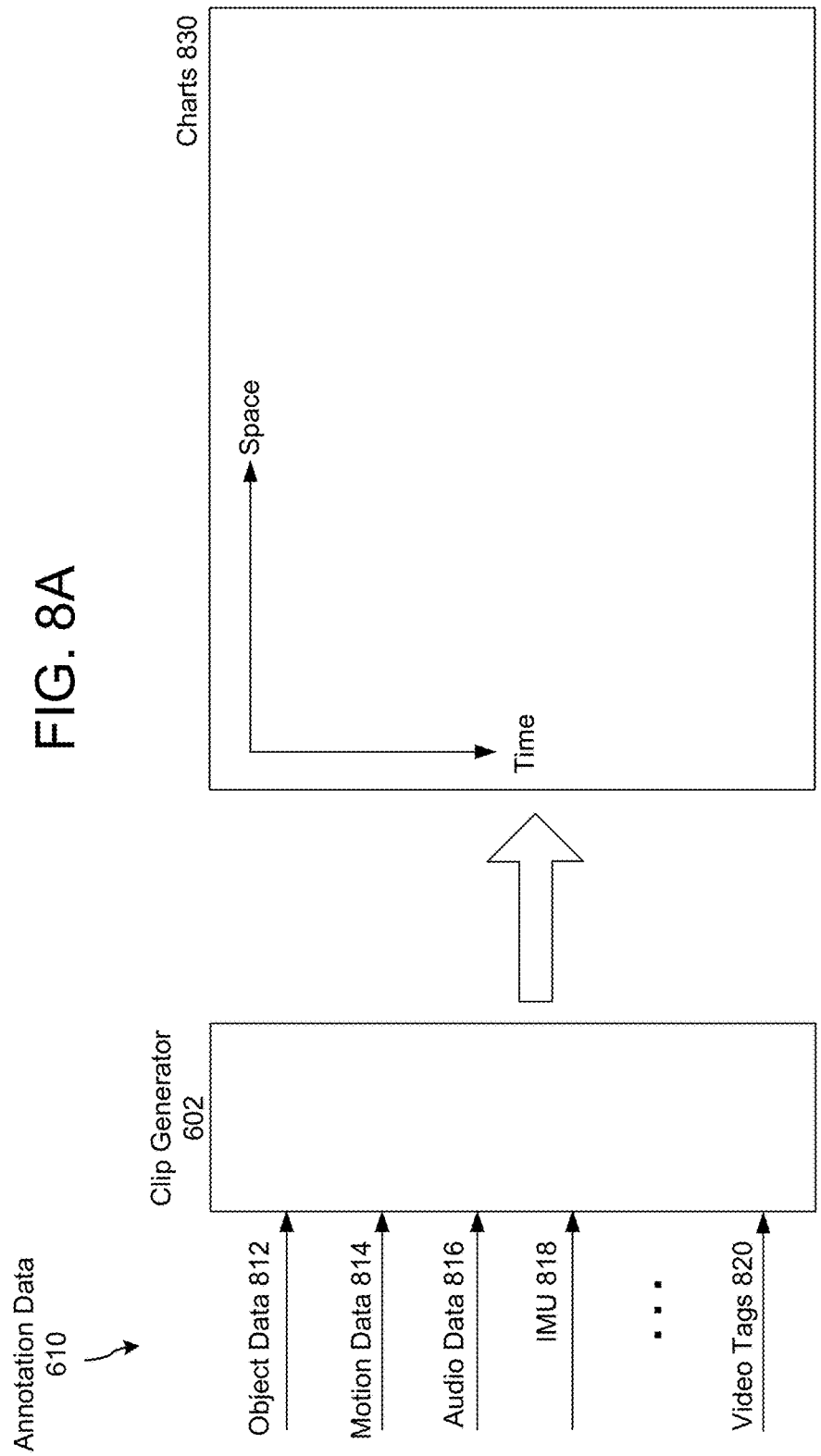

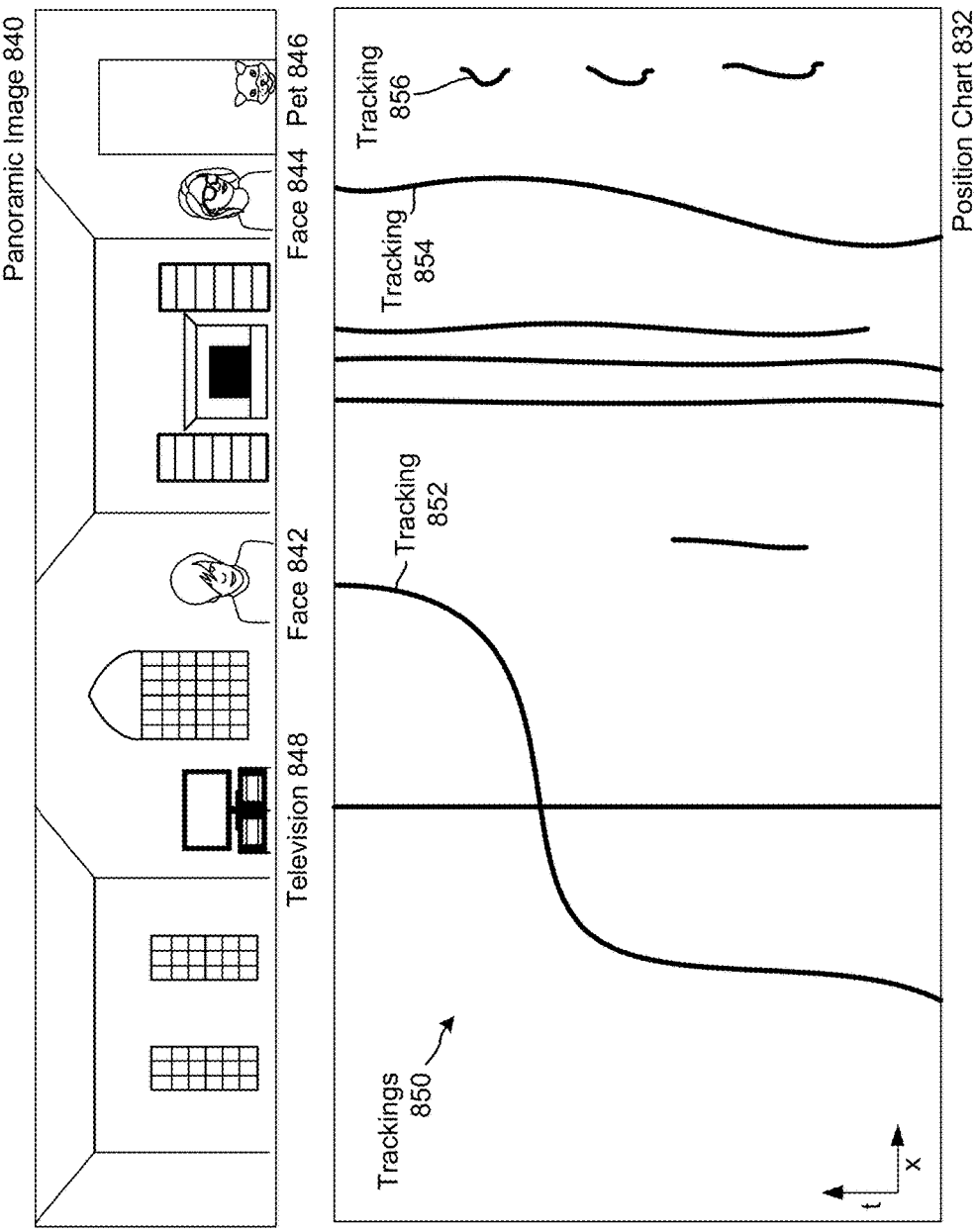

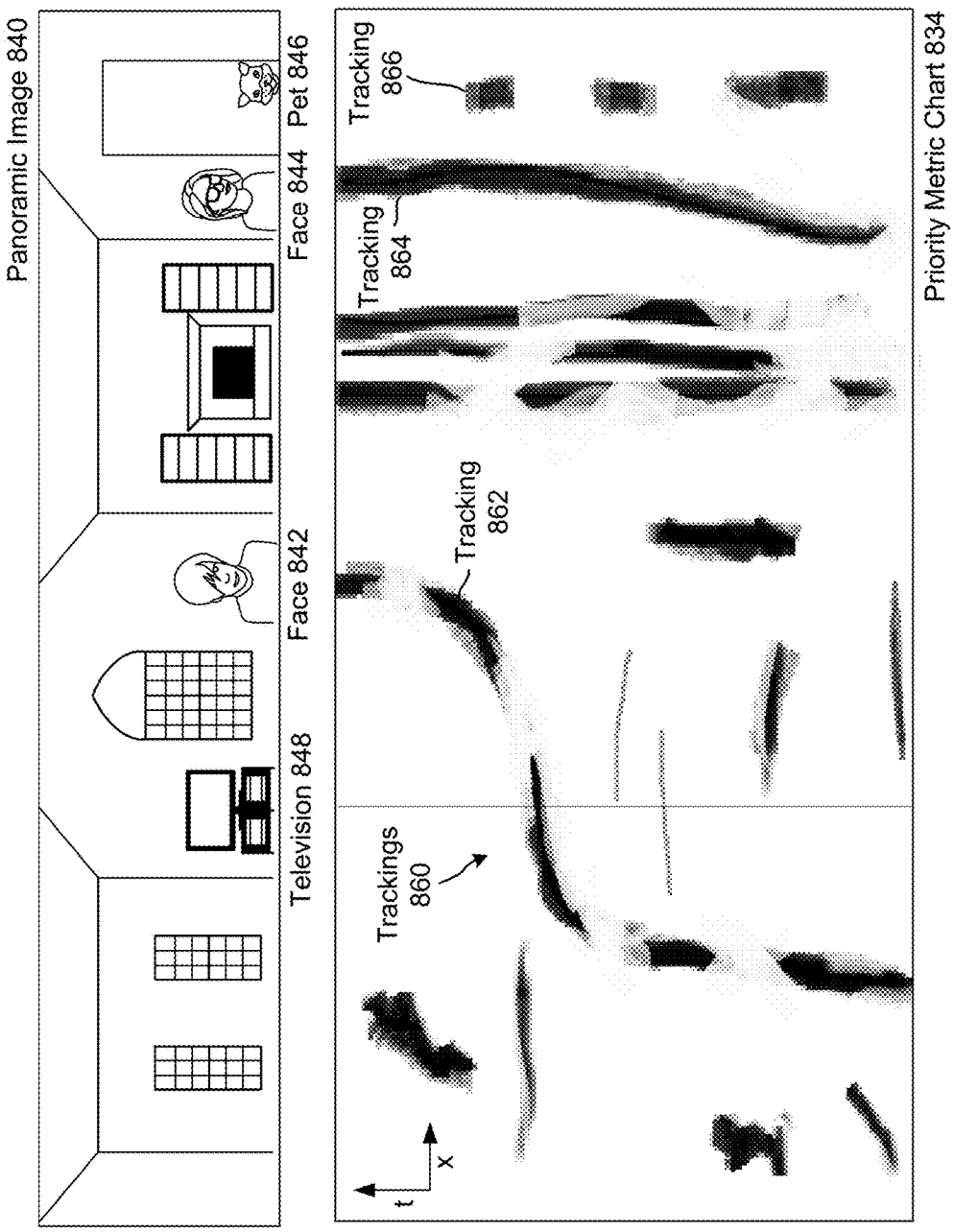

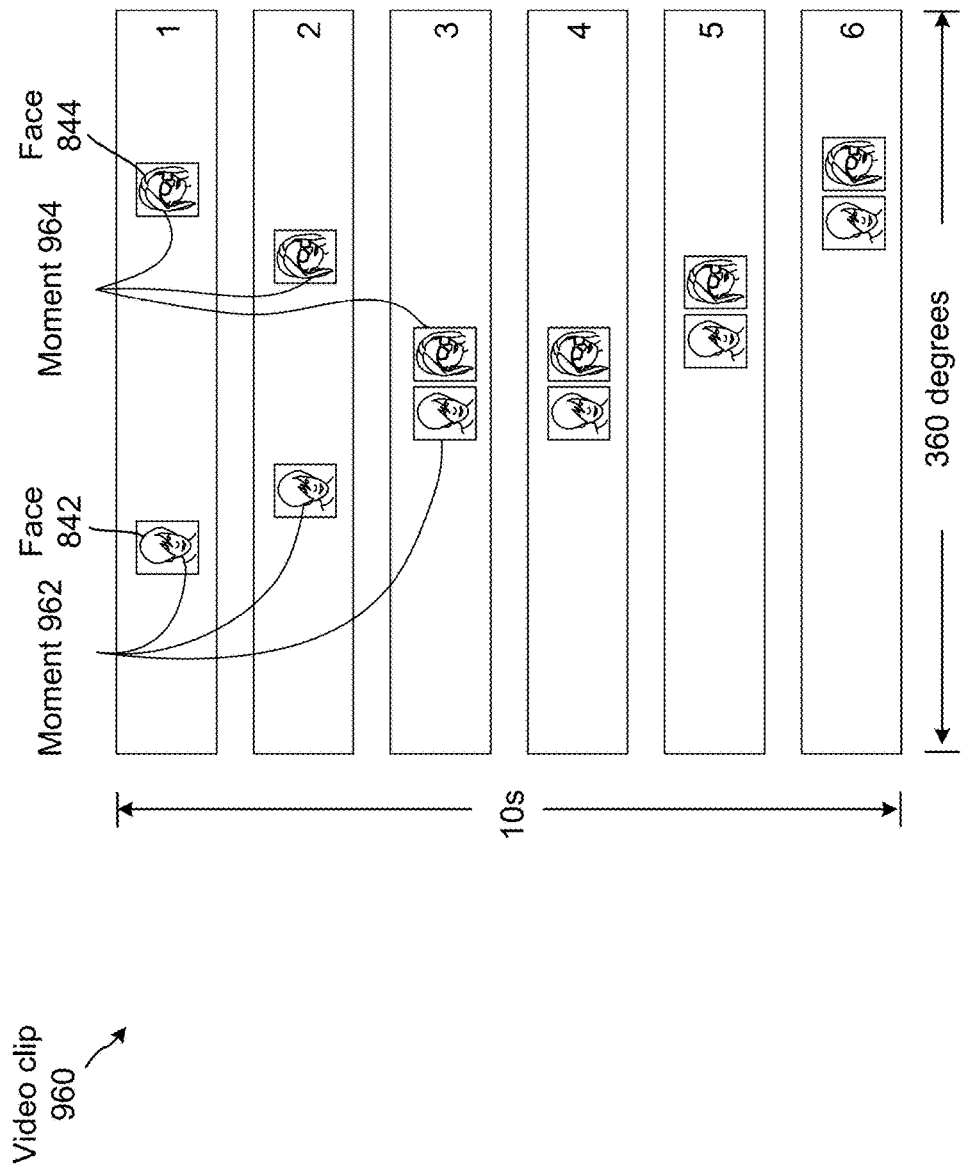

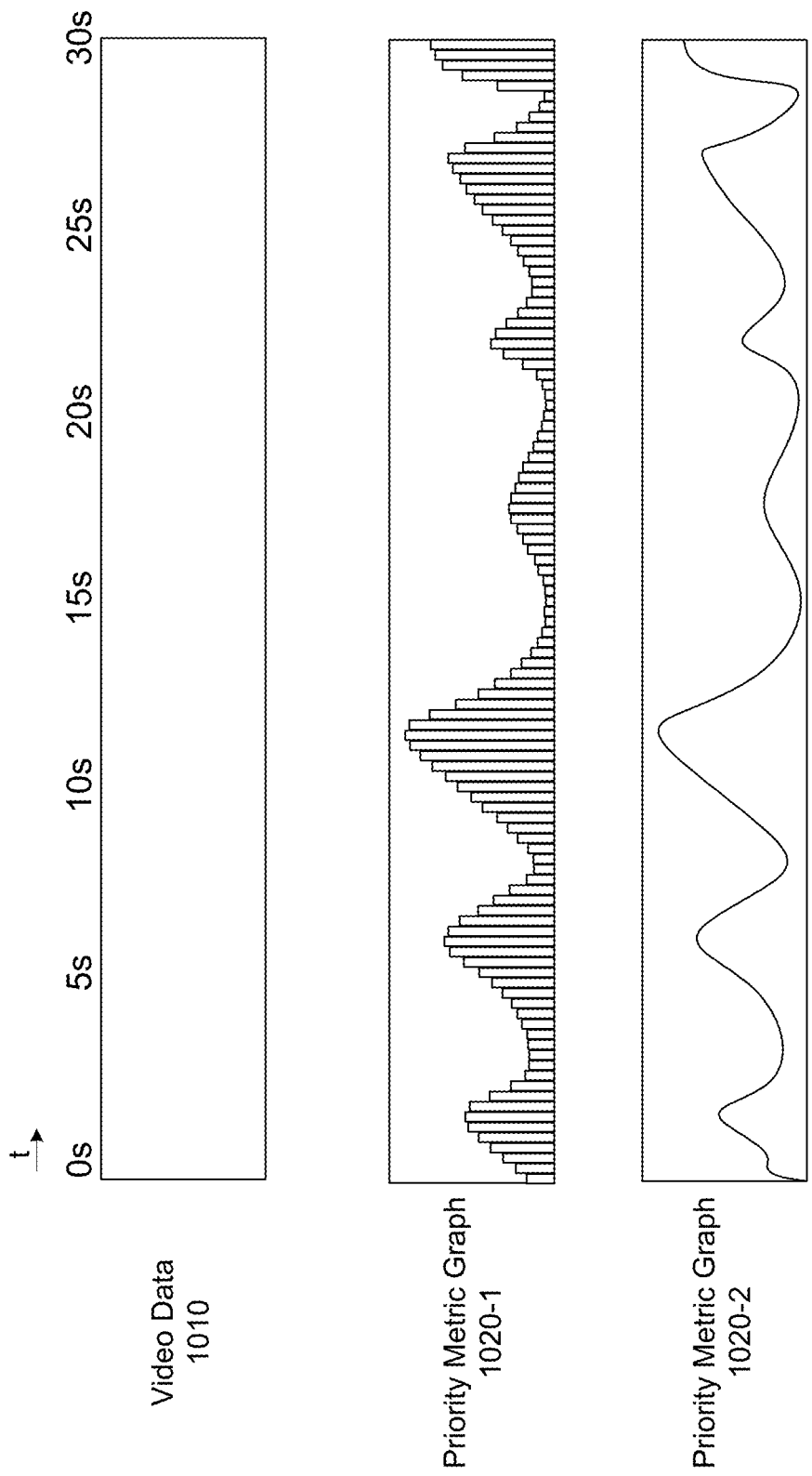

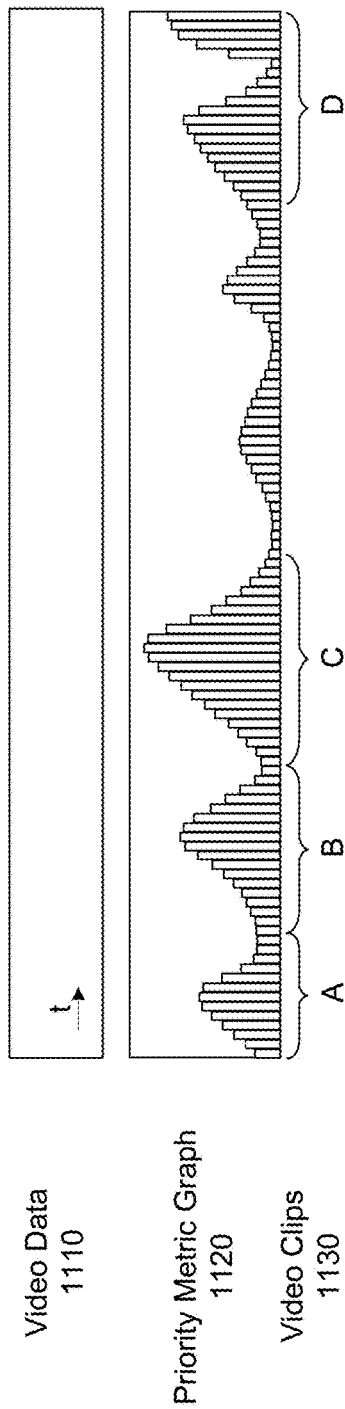
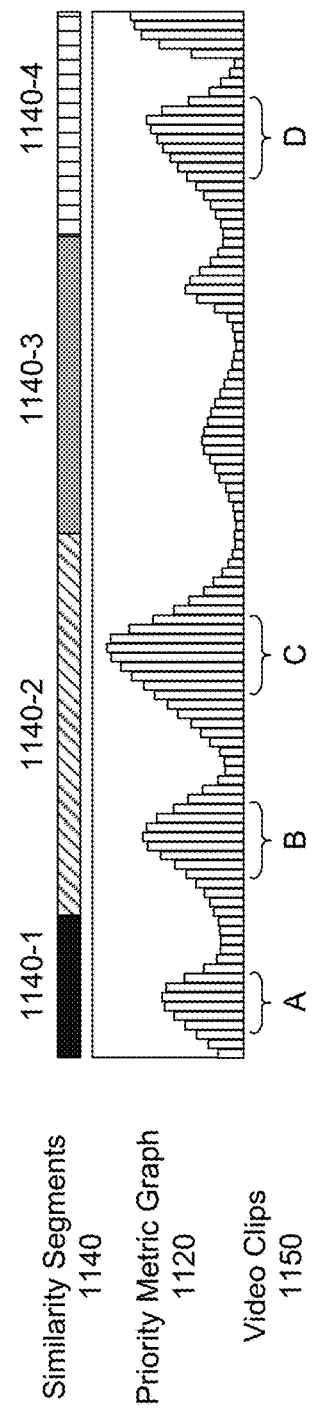

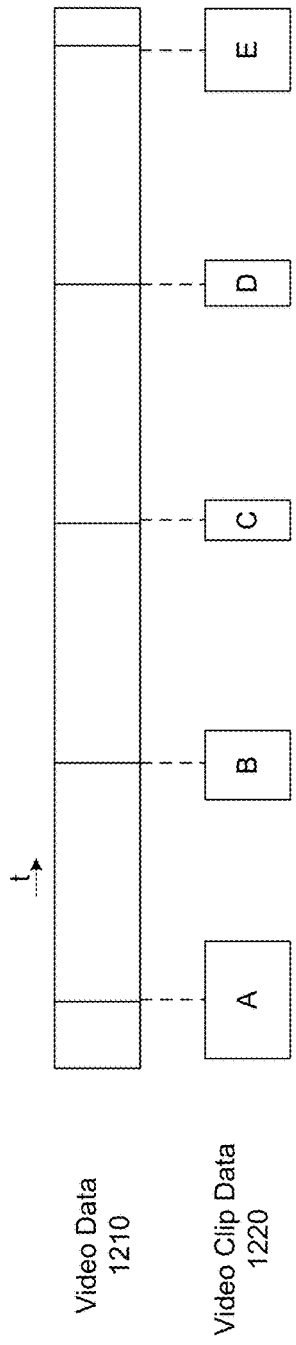
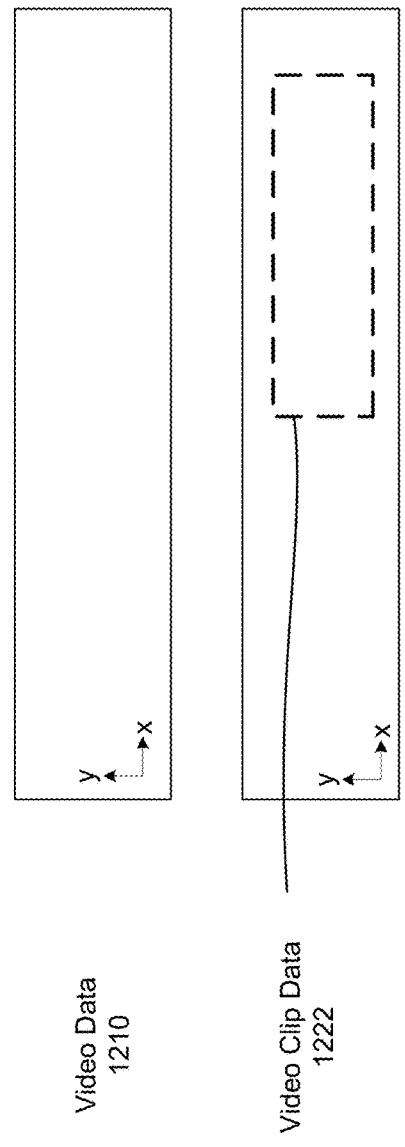

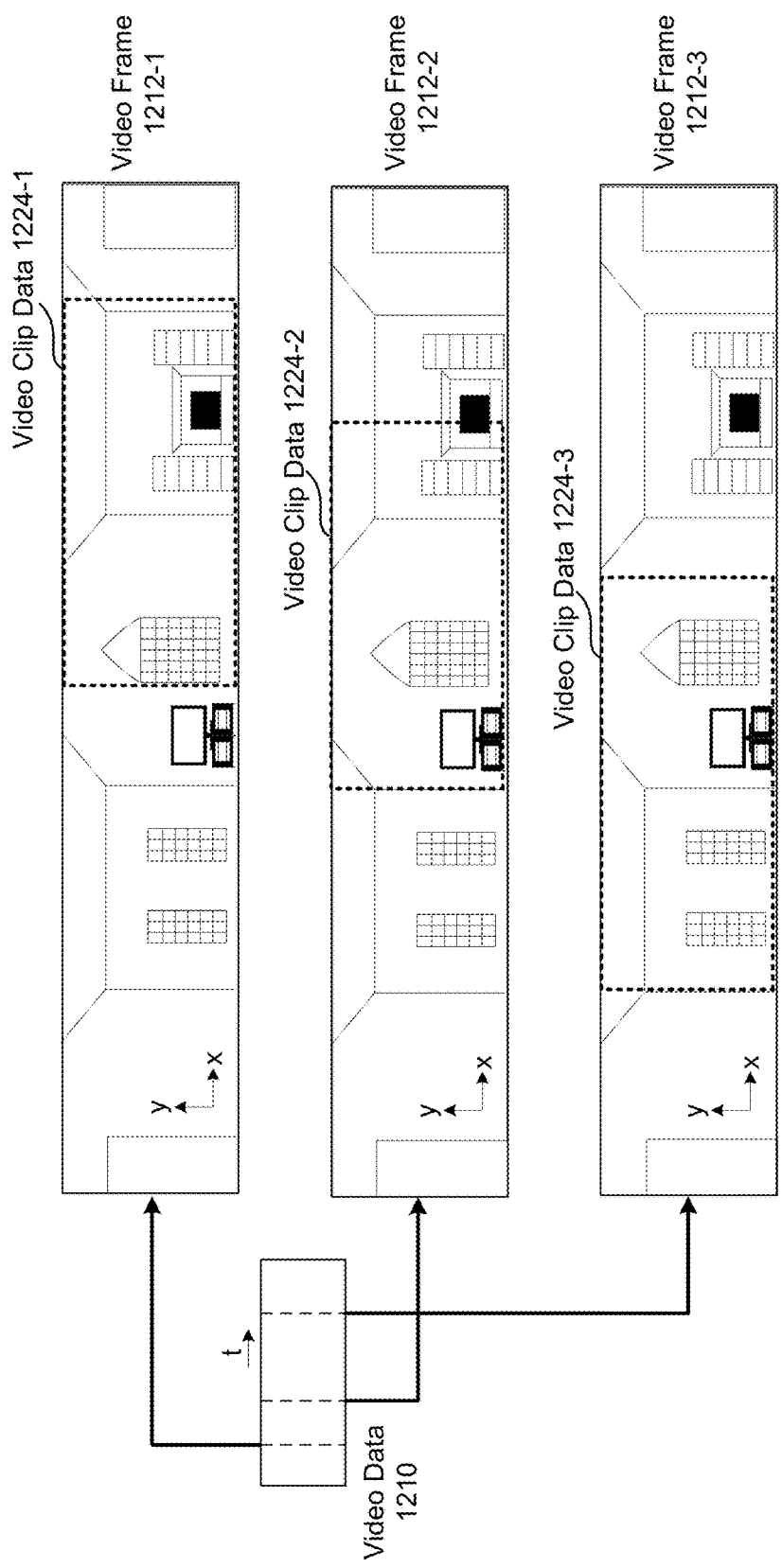

FIG. 16A

| Clip | Frames Included | Priority Metric | Summary Data | Time/Position of interesting moments |
|---|---|---|---|---|
| Clip 1 | | | | |
| Clip 2 | | | | |
| Clip 3 | | | | |
| Clip 4 | | | | |
| Clip 5 | | | | |
| Clip 6 | | | | |
| Clip 7 | | | | |

Master Clip Table (MCT) 1620

FIG. 16B

| Clip | Capture Date | Frames Included | Priority Metric | Summary Data | Time/Position of interesting moments |
|---|---|---|---|---|---|
| Clip 1 | 9/15/2015 | | | | |
| Clip 2 | 9/15/2015 | | | | |
| Clip 3 | 9/15/2015 | | | | |
| Clip 4 | 9/15/2015 | | | | |
| Clip 50 | 9/24/2015 | | | | |
| Clip 51 | 9/24/2015 | | | | |
| Clip 52 | 9/24/2015 | | | | |

Master Clip Table (MCT) 1622

FIG. 16C

| | Group 1 | Group 2 | Group 3 | Group 4 | Group 5 |
|---|---|---|---|---|---|
| Face 1 | | | | | |
| Face 2 | | | | | |
| Scene 1 | | | | | |
| Scene 2 | | | | | |
| Object 1 | | | | | |
| Object 2 | | | | | |
| Summary Data | Frame selector statistic(s) identifying transitions, Frame similarity index, etc. | | | | |

Detection Results Database 1630

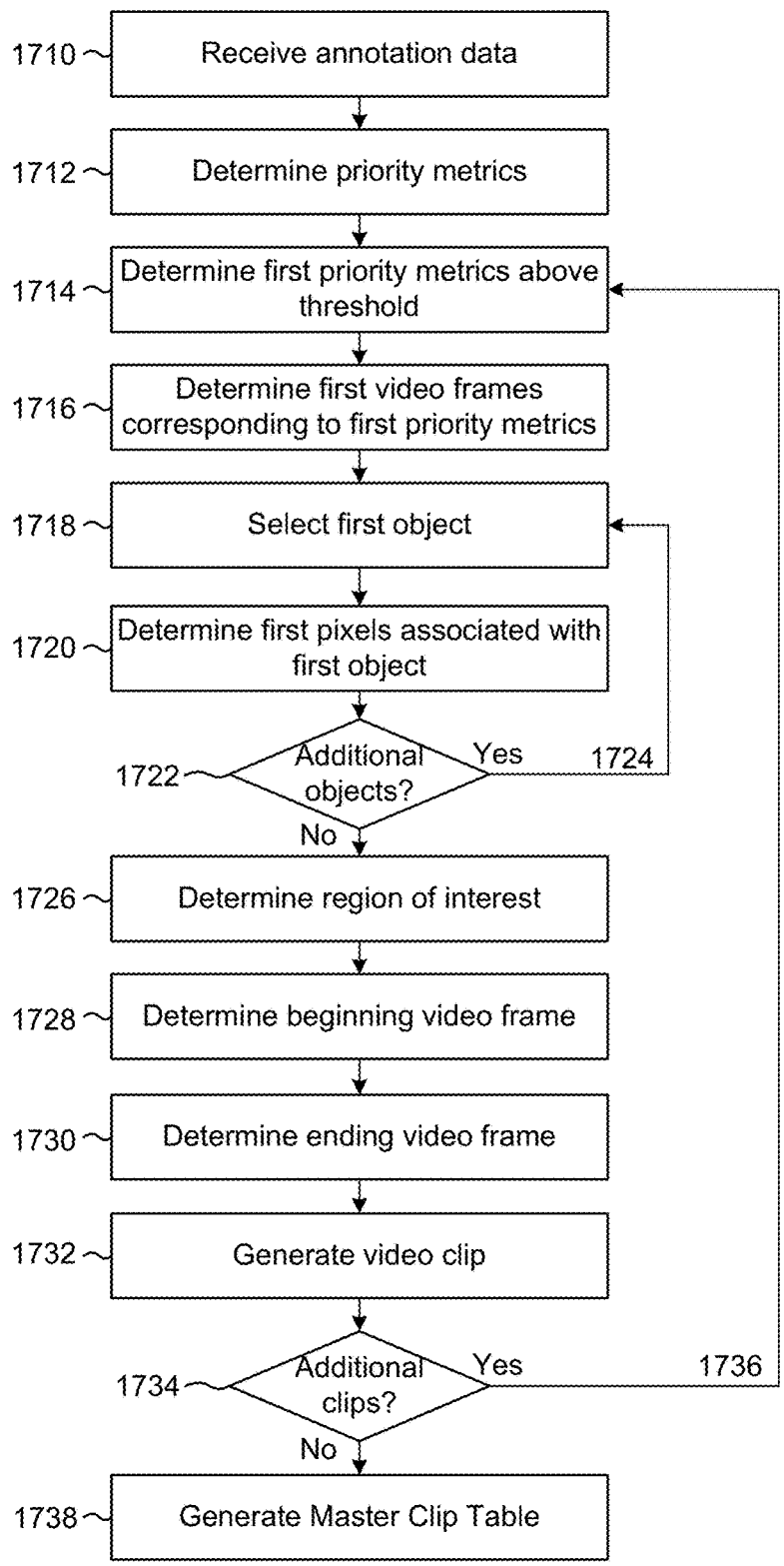

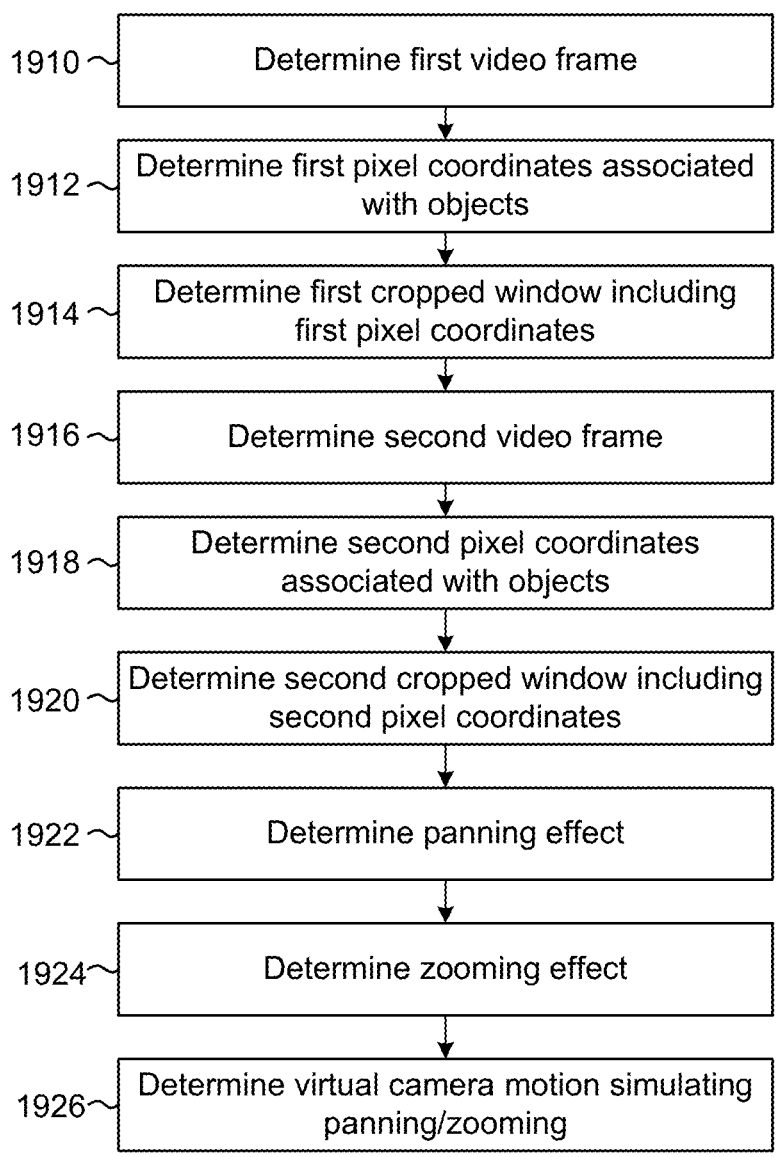

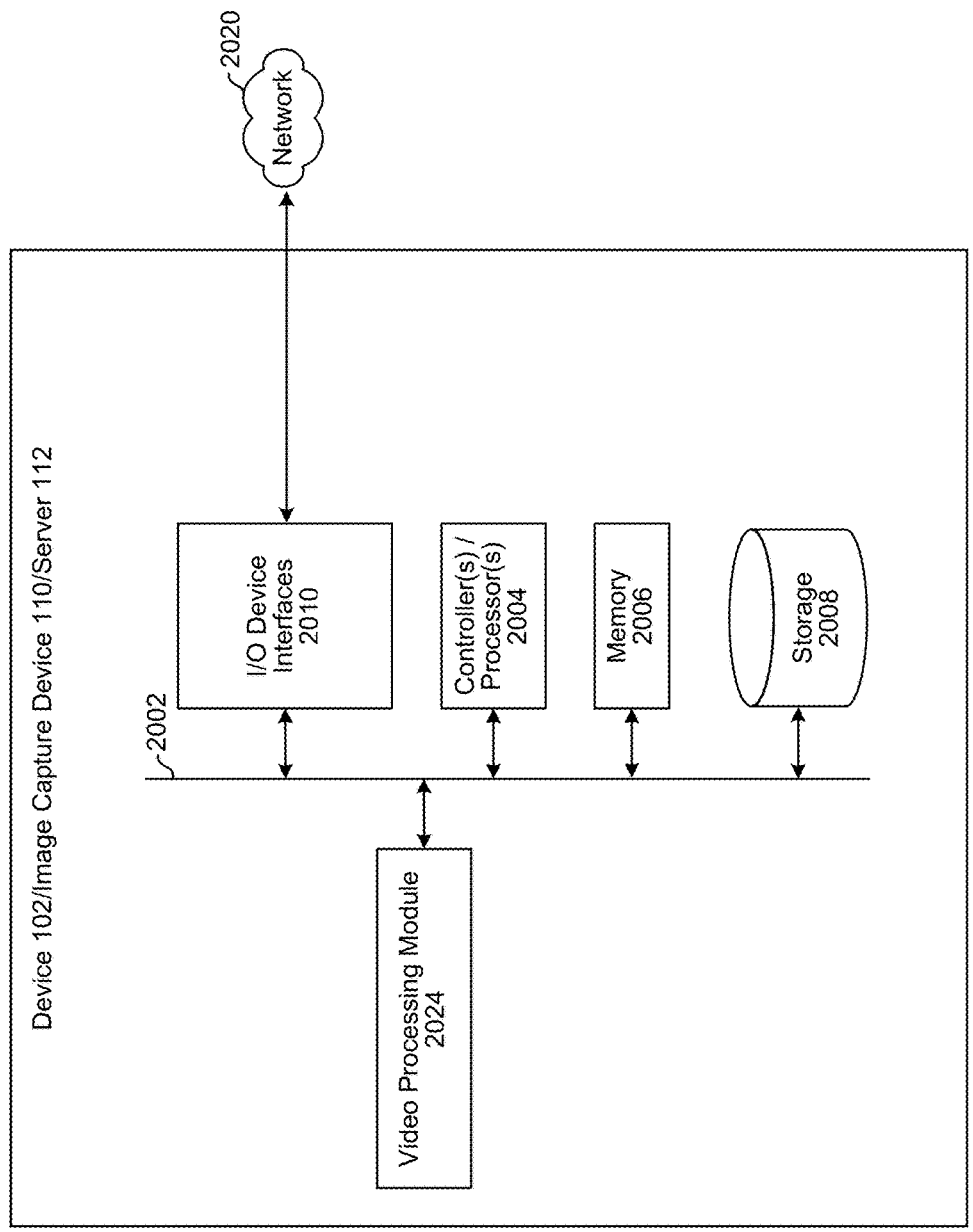

CATALOGING VIDEO AND CREATING VIDEO SUMMARIES

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIGS. 2A-2B illustrate examples of cropping video data in time and space according to embodiments of the present disclosure.

FIGS. 5A-5C illustrate examples of annotation data according to embodiments of the present disclosure.

FIG. 6 illustrates an example of a clip generator according to embodiments of the present disclosure.

FIGS. 8A-8C illustrate examples of receiving annotation data and generating visualization charts according to embodiments of the present disclosure.

FIGS. 9A-9C illustrate examples of moments according to embodiments of the present disclosure.

FIG. 10 illustrates examples of priority metric graphs according to embodiments of the present disclosure.

FIGS. 11A-11B illustrate examples of selecting video sections according to embodiments of the present disclosure.

FIGS. 12A-12C illustrate examples of selecting portions of video data in time and/or space according to embodiments of the present disclosure.

FIGS. 16A-16D illustrate examples of annotation data generated by the clip generator according to embodiments of the present disclosure.

FIG. 17 is a flowchart conceptually illustrating an example method for generating a master clip table according to embodiments of the present disclosure.

FIG. 19 is a flowchart conceptually illustrating an example method for determining virtual camera motion according to embodiments of the present disclosure.

FIG. 20 is a block diagram conceptually illustrating example components of a system according to embodiments of the present disclosure.

DETAILED DESCRIPTION

Electronic devices are commonly used to capture video data. The devices may capture video data over a lengthy period of time and some devices may capture a wide field of view in order to capture video showing a wide area. Given the amount of captured video, interesting moments from the video may be overlooked by a user or the user may not perform additional processing on the captured video.

To identify important moments from the video and reduce an amount of video data on which to perform additional processing, devices, systems and methods are disclosed that use annotation data to determine moments and/or video clips of interest from the captured video. For example, using the annotation data the server may identify positions of objects or other characteristics represented in the video data over time. The server may associate priority metrics (e.g., interesting scores) with the objects or characteristics and may generate a priority metric mapping that associates the priority metrics with corresponding positions of the objects over time. Using the mapping, the server may determine regions of interest (e.g., pixel coordinates) associated with a moment and a duration (e.g., video frames) of the moment. The server may determine video clips including one or more moments. In some examples, the server may determine virtual camera motion including simulated panning and/or zooming within the video data.

Figure 1:
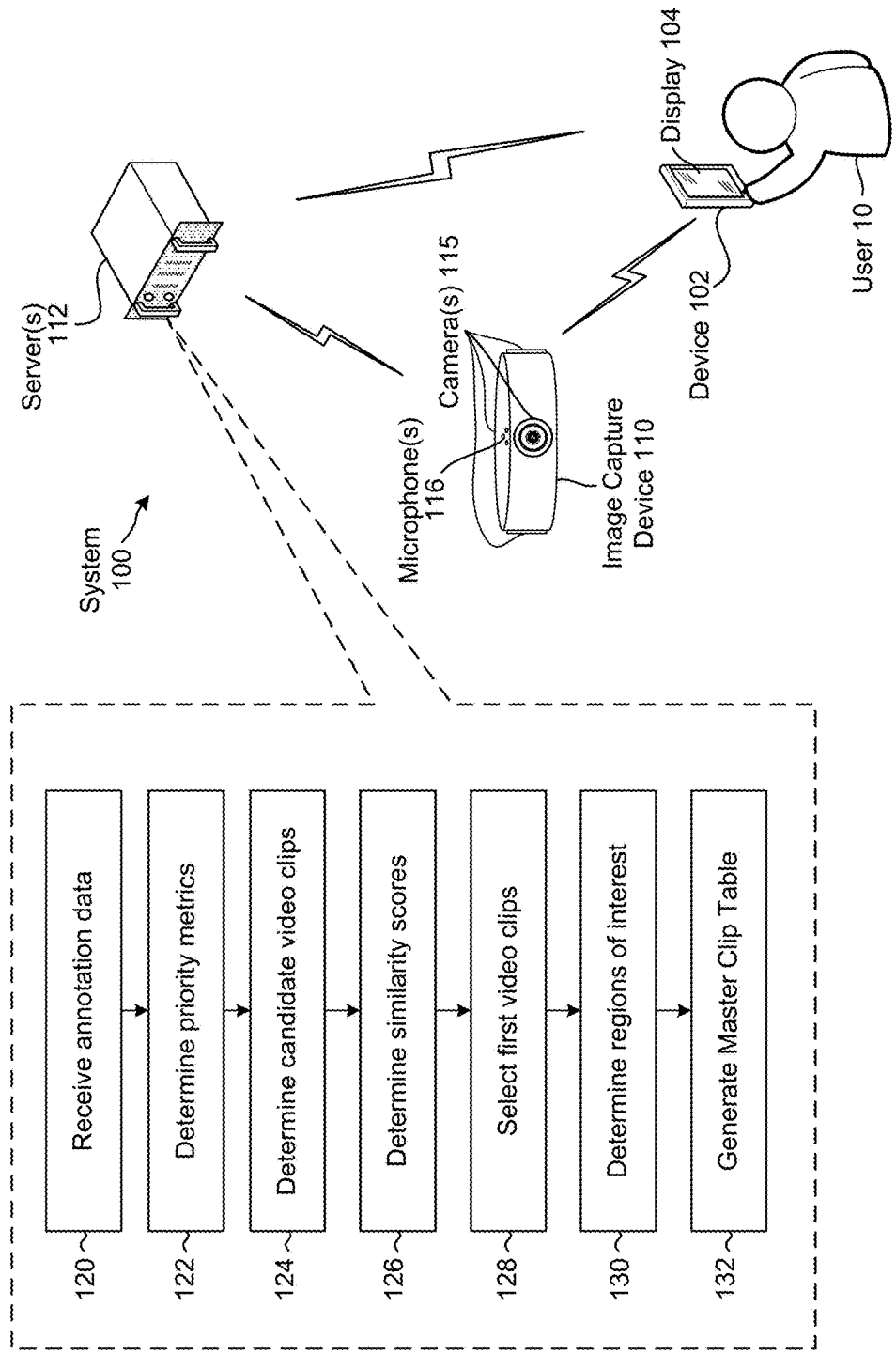
FIG. 1 illustrate overviews of systems for implementing embodiments of the present disclosure.

FIG. 1 illustrates an overview of a system 100 for implementing embodiments of the disclosure. The system 100 includes a device 102 having a display 104, an image capture device 110 (having camera(s) 115 and microphone(s) 116) and server(s) 112 all in communication with each other. While FIG. 1 illustrates the camera(s) 115 being equally spaced around the image capture device 110, the disclosure is not limited thereto and a location of the camera(s) 115 may vary without departing from the disclosure. Similarly, while FIG. 1 illustrates the microphone(s) 116 located on a top portion of the image capture device 110, the disclosure is not limited thereto and a location of the microphone(s) 116 may vary without departing from the disclosure. For example, the microphone(s) 116 may be aligned with the camera(s) 115 or may be spaced between the camera(s) 115 without departing from the disclosure.

While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the image capture device 110 and the server(s) 112 may perform all of the steps illustrated in the drawings without communicating with the device 102.

As illustrated in FIG. 1, the server(s) 112 may receive (120) annotation data associated with panoramic video data. The annotation data may indicate subjects included in the panoramic video data or other characteristics of the video data (hereinafter, subjects and characteristics may be jointly referred to as "characteristics"), such as specific identities, people, faces, objects, pets, locations, landmarks, scenes, etc. represented in the panoramic video data or motion data, scene data, audio information, time data, directional data, etc. corresponding to the panoramic video data. In some examples, the annotation data may include an annotation database listing individual video frames and associated characteristics and/or video tag(s) indicating characteristics corresponding to specific video frame(s).

The server(s) 112 may determine (122) priority metrics based on the annotation data. For example, the server(s) 112 may determine a priority metric (e.g., interesting score) for individual video frames within the panoramic video data using the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. Thus, the server(s) 112 may determine (124) candidate video clips based on the priority metrics. For example, the server(s) 112 may identify a series of video frames (e.g., 5-60 seconds) having a priority metric above a threshold and may select the series of video frames as a candidate video clip.

To select from the candidate video clips, the server(s) 112 may determine similarity scores between the candidate video clips. For example, the server(s) 112 may determine a first similarity score between a first candidate video clip and a second candidate video clip. In some examples, the server(s) 112 may determine the similarity scores based on video "fingerprints" that indicate characteristics of the candidate video clips that may be used to identify similar video clips. For example, the characteristics of the candidate video clips may include feature vectors, histograms of image data, gradients of the image data, histograms of gradients, a signature of the image data or the like that may be used to determine if image data is similar between candidate video clips. Additionally or alternatively, the server(s) 112 may determine the similarity scores using image features (e.g., color histograms) extracted from the candidate video clips, spatial correlation, normalized cross-correlation (NCC) and/or motion vectors across the candidate video clips and/or individual video frames of the candidate video clips.

The server(s) 112 may select (128) first video clips from the candidate video clips based on the priority metrics and/or the similarity scores. For example, the server(s) 112 may select the first video clips based on priority metrics using a global threshold. Thus, the server(s) 112 may select any of the candidate video clips having a peak priority metric value, average priority metric value and/or sum of the priority metrics exceeding a global threshold. In some examples, the server(s) 112 may select the first video clips based on priority metrics using a variable threshold. Thus, the server(s) 112 may separate the candidate video clips, determine different thresholds for each group of candidate video clips and select the candidate video clips exceeding the corresponding threshold. Additionally or alternatively, the server(s) 112 may select the first video clips based on the priority metrics and the similarity scores. Thus, the server(s) 112 may group the candidate video clips based on the similarity scores and may select a desired number of candidate video clips from each group based on a highest priority metric. For example, the server(s) 112 may group ten candidate video clips together based on the similarity score and may select three candidate video clips having the highest priority metric as the first video clips to increase a diversity between the first video clips.

The server(s) 112 may determine (130) regions of interest within the first video clips. For example, the server(s) 112 may determine pixel coordinates associated with an object of interest in a first video clip and may determine the region of interest based on the pixel coordinates. Thus, the first video clips may indicate specific video frames of interest and the regions of interest may indicate specific areas within the video frames.

The server(s) 112 may generate (132) a Master Clip Table (MCT) including entries associated with the first video clips. The MCT may indicate which frames are associated with a video clip (e.g., Clip 1 may be associated with Frames 1-450, which corresponds to a 15 second video clip at 30 frames per second), a priority metric associated with the video clip, summary data (e.g., video fingerprint) associated with the video clip and/or a time/position of interesting moments within the video clip (e.g., pixel coordinates associated with individual timestamps corresponding to the moment).

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip).

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, a video clip may be a short section of the video data (having any aspect ratio) including content determined to be "interesting" or desirable for purposes of video summarization. For example, video data may include several video clips that the device 102, the image capture device 110 and/or the server(s) 112 may extract from the video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video tag is a tag (i.e., data structure) including annotation information that may be used in video summarization and/or rendering information that may be used to render a video. Examples of annotation information include an object, a person, an identity of a person, an angle relative to a camera axis, an area associated with a subject, a position associated with the subject, a timestamp (e.g., a time associated with receiving user input, a time associated with an individual video frame, a range of time associated with a sequence of video frames or the like) and/or other annotation data associated with video frame(s). Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art. As described in greater detail above with regard to FIG. 1, the server(s) 112 may determine a video snippet from video data and include parameters of the video snippet in a video tag for video summarization. Therefore, any steps describing processing and/or editing of the video data may also refer to storing processing information in a video tag for subsequent video processing and/or editing of the video data.

The server(s) 112 may render the video (e.g., generate the video summarization) using rendering information included in the generated video tags. For example, the rendering information may indicate an order of the selected video clips, the begin point and end point associated with the individual video clips, the selected theme, the selected panning for the individual video clip(s), the special effects, the audio data and/or other editing steps. As a first example, a first video tag may indicate the order of the selected video clips, a second video tag may indicate the begin point and the end point associated with a single video clip, etc. As a second example, a single video tag may include multiple edits, such as a first video tag indicating the begin point and the end point associated with a single video clip along with the selected panning for the single video clip and the special effects and/or audio data associated with the selected video clip. The video tags may correspond to individual video clip or a group of video clip without departing from the disclosure.

A moment may be associated with a region of interest within a video clip, which may include a time range (e.g., beginning frame and an ending frame) and a position (e.g., x and y pixel coordinates) within the video data. The server(s) 112 may generate video clips based on the time range associated with the moment, but a video clip may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization, such that the video summarization only includes the portion of the pixel coordinates associated with the region of interest (indicated by the framing windows) over the time range.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate tags using the device 102 to identify moments of particular interest to be included in the video summarization. The image capture device 110 may capture video data throughout the party, but the user 10 may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric value. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

As part of generating the video summarization, the device 102 may display output video data and may request input from a user 10 of the device 102. For example, the user 10 may instruct the device 102 to generate additional video data (e.g., create an additional video summarization), to modify an amount of video data included in the output video data (e.g., change a beginning time and/or an ending time to increase or decrease a length of the output video data), to modify a portion of the video data included in the output video data (e.g., zoom or pan within the video data), shift a time window associated with a video snippet within the output video data (e.g., change a beginning time of a video snippet without changing the time window), specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

Figure 3:
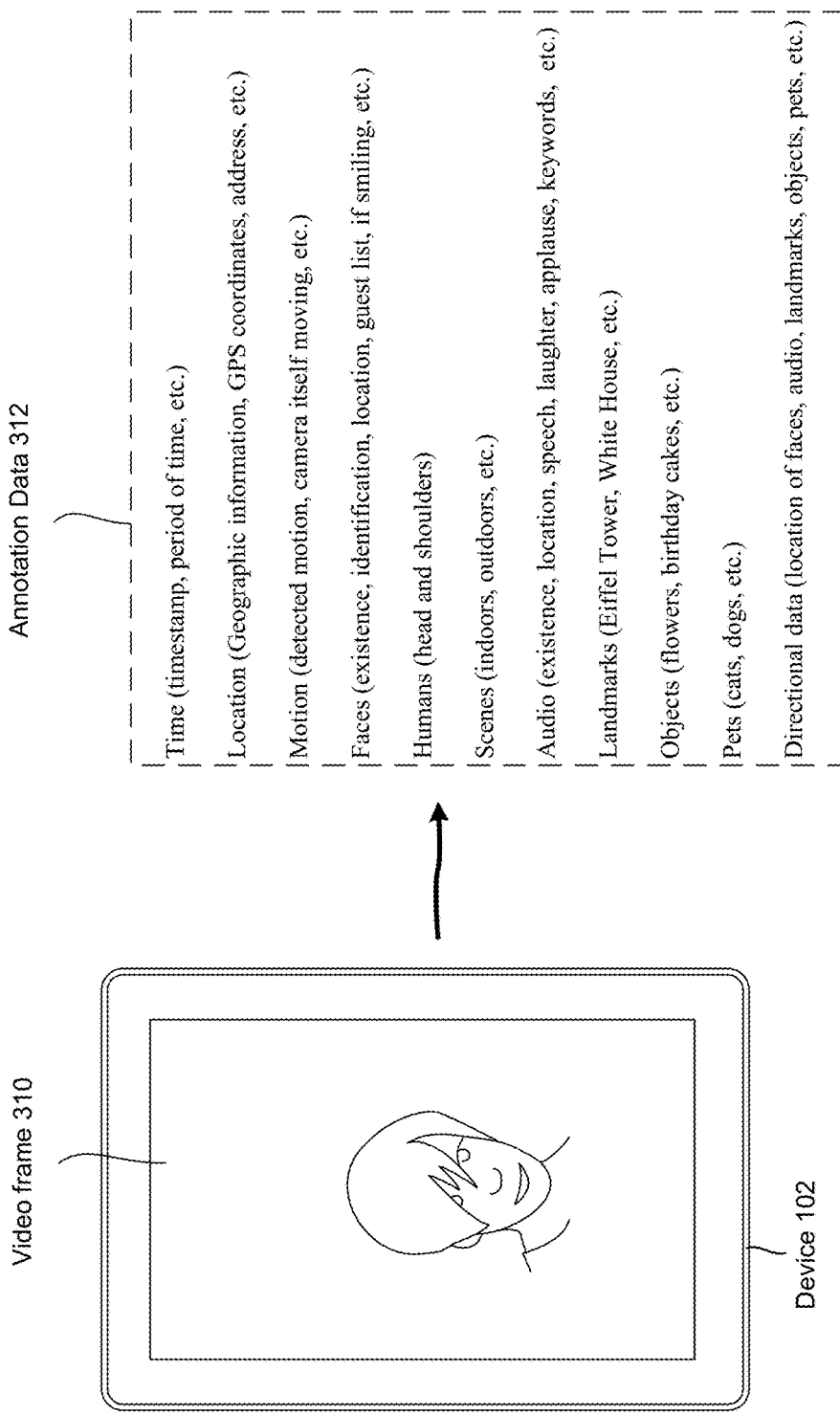
FIG. 3 illustrates an example of annotation data according to embodiments of the present disclosure.

FIG. 3 illustrates an example of types of annotation data according to embodiments of the present disclosure. As illustrated in FIG. 3, the server(s) 112 may analyze a video frame 310 and generate annotation data 312, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame). In some examples, the annotation data may indicate an area within (e.g., x and y pixel coordinates) the video data that is of interest. For example, the image capture device 110 may capture video data including a first portion (e.g., a stage of a concert or the like) and a second portion (e.g., a back wall opposite the stage), and the annotation data may indicate the area associated with the first portion. Using the annotation data, the server(s) 112 may emphasize the first portion and omit the second portion.

In addition to the annotation data illustrated in FIG. 3, the server(s) 112 may generate additional annotation data. For example, the server(s) 112 may generate emotional data, which may include emotional detection (e.g., determining a mood such as happy, sad, excited, etc.) for an individual, a group of people, the video frame 310 or a combination thereof. As another example, the server(s) 112 may determine if a concert or other event is represented in the video frame 310 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

Figure 4:
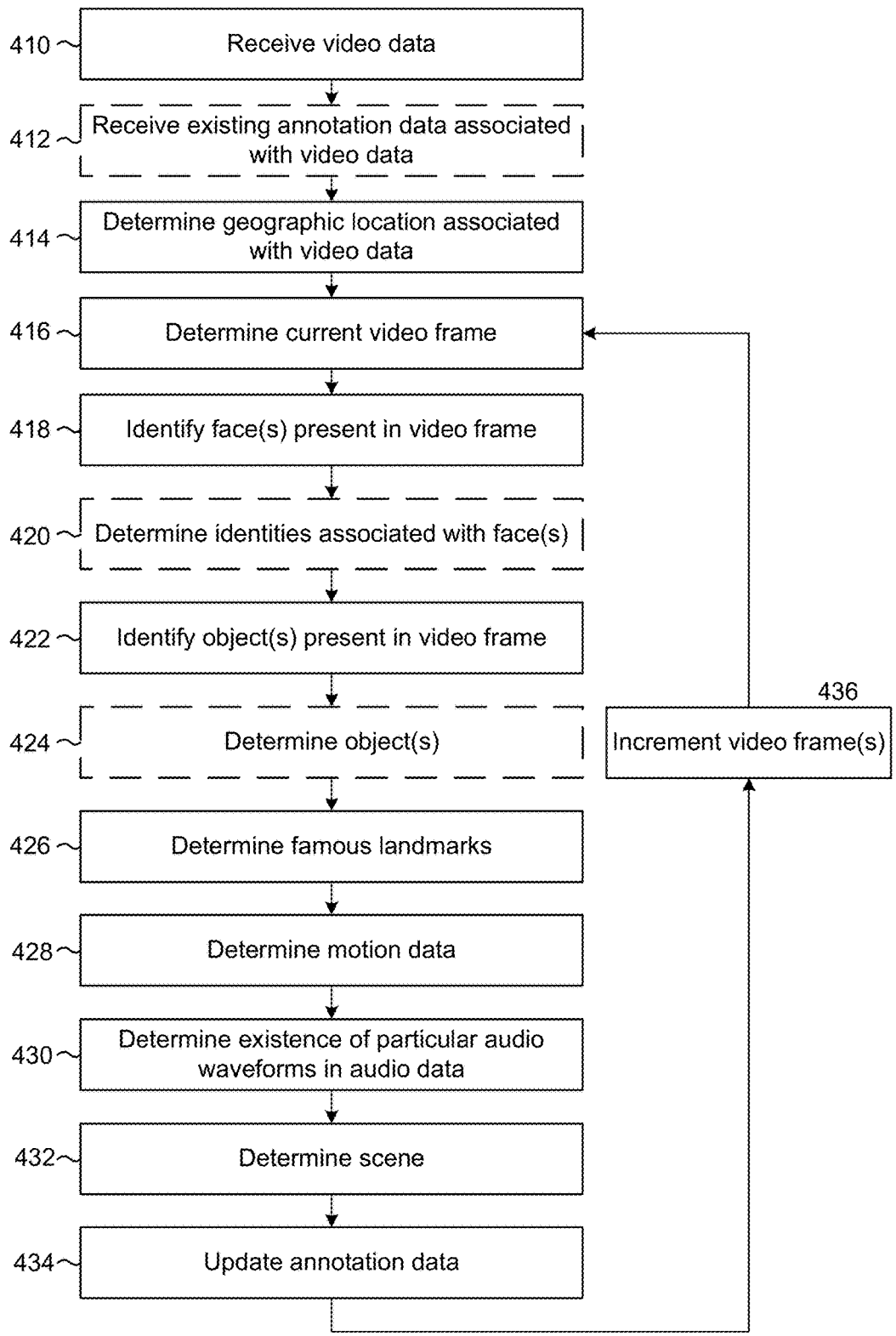
FIG. 4 is a flowchart conceptually illustrating an example method for generating annotation data according to embodiments of the present disclosure.

FIG. 4 is a flowchart conceptually illustrating an example method for generating annotation data according to embodiments of the present disclosure. As discussed above, the annotation data may be generated by the server(s) 112 or a remote device prior to generating the video summarization. For example, the server(s) 112 may generate annotation data upon receiving individual video clips, upon receiving video data or upon receiving a request for a video summarization. For ease of explanation, some of the steps illustrated in FIG. 4 are explicitly depicted as optional, indicated by dashed lines. However, any of the steps illustrated in FIG. 4 may be omitted without departing from the present disclosure. In addition, while the following description refers to the steps illustrated in FIG. 4 being executed by the server(s) 112, some or all of the steps illustrated in FIG. 4 may be executed by the device 102, the image capture device 110, the server(s) 112, a remote device or any combination thereof.

As illustrated in FIG. 4, the server(s) 112 may receive (410) video data and may optionally receive (412) existing annotation data associated with the video data. The server(s) 112 may receive the video data from a remote device (e.g., the device 102, the image capture device 110, a second server(s) 112 or the like) or by accessing the video data on the server(s) 112. The existing annotation data may have been determined by any of the device 102, the image capture device 110, the server(s) 112 and/or a remote device prior to the system receiving the video data in step 410. While video data may include multiple video clips, the video data illustrated in FIG. 4 refers to video data associated with a single video clip (e.g., a video clip captured from a beginning time to an ending time). The server(s) 112 may determine (414) a geographic location associated with the video data, such as a Global Positioning System (GPS) coordinates associated with where the video data was captured. However, the geographic location is not limited to the GPS coordinates and the server(s) 112 may determine a geographic location based on the GPS coordinates. If the video data is captured while in motion (e.g., in a plane, a car or other vehicle), the geographic location may be associated with the beginning time or the ending time of the video data.

The server(s) 112 may determine (416) a current video frame and may identify (418) face(s) present in the video frame. For example, the server(s) 112 may analyze the video frame and identify the face(s) based on facial recognition, identifying head and shoulders, identifying eyes, smile recognition or the like. Optionally, the server(s) 112 may determine (420) identities associated with the face(s). For example, the server(s) 112 may employ facial recognition and a database of identities, such as social networking database, to determine the identities. In some examples, the video data will be tagged with identities of faces represented in the video data. Thus, the server(s) 112 may determine the identity of a face in a video frame from a list of identities associated with the video data.

The server(s) 112 may identify (422) object(s) present in the video frame. For example, the server(s) 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server(s) 112 may determine (424) object(s), which may include determining a type of object, a brand of the object, a name for the object or the like. Thus, whereas step 422 identifies an existence of the object in the video frame, step 424 identifies an identity of the object or otherwise recognizes what the object is. The server(s) 112 may determine (426) famous landmarks (e.g., Big Ben, a famous cathedral, monument or the like) represented in the video frame based on the geographic location. For example, the geographic location may be in proximity to a monument and the server(s) 112 may identify the monument within the video frame.

The server(s) 112 may determine (428) motion data, including motion data associated with the image capture device (e.g., movement of the image capture device while capturing the video data) and objects represented in the video data (e.g., movement of an object relative to the image capture device). The server(s) 112 may determine (430) an existence of particular audio waveforms in audio data associated with the video data. For example, the server(s) 112 may identify an existence of speech, laughter, applause or the like. In some examples, as discussed in greater detail below with regard to FIG. 9, the server(s) 112 may identify music in the audio data. The server(s) 112 may determine (432) a scene associated with the video frame. For example, the server(s) 112 may determine if the video frame was captured indoors or outdoors and may determine other characteristics that may be useful in determining a scene associated with the video frame. Finally, the server(s) 112 may update (434) the annotation data associated with the video frame and increment (436) video frame(s) (e.g., one video frame, several video frames or the like) and repeat steps 416-434. For example, the server(s) 112 may increment video frames linearly to update annotation data for video frames in the video data by one or at a fixed increment. Additionally or alternatively, the server(s) 112 may increment the video frame(s) nonlinearly to focus on annotating interesting frames, which may be determined based on a low resolution preview or other techniques. Thus, the server(s) 112 may determine an amount to increment each time step 436 is performed and the amount to increment may vary without departing from the present disclosure.

In addition to using annotation data to generate video summarizations, the server(s) 112 may use the annotation data for additional functionality. As a first example, the server(s) 112 may extract information about a user 10 from the annotation data and may use the extracted information to target advertisements to the user 10. As a second example, the server(s) 112 may collect annotation data from a plurality of users and/or video clips to collate information. Thus, the server(s) 112 may create a database of annotation data and may use the database to identify trends, brands or the like from video data from a variety of sources.

Figure 5B:

FIGS. 5A-5C illustrate examples of annotation data according to embodiments of the present disclosure. As illustrated in FIG. 5A, the server(s) 112 may store annotation data in an annotation database 510. The annotation database 510 may include the annotation data discussed above (e.g., time, location, motion, faces, humans, scenes, audio, landmarks, objects, pets, directional data, etc.) for individual video frames. As illustrated in FIG. 5A, the annotation database 510 includes Frame 1, Frame 2, Frame 3, Frame 10, Frame 11, Frame 30 and Frame 35, although the annotation database 510 may include any number of video frames and is not limited to the example illustrated in FIG. 5A. In some examples, the annotation database 510 may include an entry for individual video frames included in video data (e.g., every video frame has an entry). In other examples, the annotation database 510 may include an entry every fixed number of video frames (e.g., 5th, 10th, 15th etc.). In some examples, the annotation database 510 may include an entry whenever the annotation data changes (e.g., annotation data is associated with intervening video frames until a following entry in the annotation database 510). Additionally or alternatively, the annotation database 510 may include an entry for select video frames without departing from the present disclosure. For example, the server(s) 112 may determine a priority metric (discussed below) for individual video frames and store the annotation data associated with individual video frames having a priority metric exceeding a threshold. Other techniques for storing annotation data may also be used.

The server(s) 112 may determine the priority metric (e.g., interesting score) using the annotation data. For example, the server(s) 112 may use an algorithm or other technique to calculate the priority metric based on objects included in the video frame or other characteristics of the video frame. The priority metric may be used to generate video clips and/or to rank individual video frames. For example, the server(s) 112 may determine first video frames associated with priority metrics exceeding a threshold and may group first video frames in proximity to generate a video clip. As an example, the server(s) 112 may determine that Frames 1-11 are associated with priority metrics exceeding the threshold and may generate a video clip including Frames 1-11.

The annotation database 510 illustrated in FIG. 5A may include video frames for multiple clips included in the video data. However, the disclosure is not limited thereto and FIG. 5B illustrates an annotation database 512 for an individual video clip. As illustrated in FIG. 5B, the annotation database 512 includes Frame 1, Frame 2, Frame 3, Frame 10, Frame 11, Frame 30 and Summary Data associated with the overall video clip. The annotation database 512 includes a series of columns corresponding to annotation data that is included in the video clip and indicates whether the annotation data is represented in each video frame. For example, Face 1 is represented in Frame 1, Frame 2, Frame 3, Frame 10, Frame 11 and Frame 30, while Face 3 is only represented in Frame 11 and Frame 30. Thus, the annotation database 512 may indicate the annotation data associated with individual video frames.

The summary data may include statistics for the video clip that are unique to the particular video clip. For example, the summary data may include a frame selector statistic identifying transitions within the video clip (e.g., grouping the video frames based on a similarity index) or the like. Additionally or alternatively, the summary data may include video "fingerprints" that indicate characteristics of the video clip that may be used to identify similar video clips. For example, the characteristics of the video clip may include feature vectors, histograms of image data, gradients of the image data, histograms of gradients, a signature of the image data or the like that may be used to determine if image data is similar between video clips.

While the annotation database 512 illustrated in FIG. 5B lists individual frames for the video clip, video frames may be grouped together as illustrated in the annotation database 514 illustrated in FIG. 5C. For example, the annotation database 514 groups Frames 1-200, Frames 350-600, Frames 800-1200, Frames 1500-1650 and Frames 2000-2200, Frames 2400-2550. The annotation database 514 may group the video frames based on annotation data and/or the frame selector statistic for the overall video clip.

FIG. 6 illustrates an example of a clip generator according to embodiments of the present disclosure. As illustrated in FIG. 6, a clip generator 602 may receive inputs 600 and may generate outputs 604. For example, the inputs 600 may include annotation data 610 (e.g., time, location, motion, faces, humans, scenes, audio, landmarks, objects, pets, directional data, etc.) associated with individual video frames of video data, as discussed in greater detail above with regard to FIGS. 3-5C. For example, the annotation data 610 may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame), although the disclosure is not limited thereto. The clip generator 602 may use the annotation data to perform steps 122-130, which are discussed in greater detail above with regard to FIG. 1, to determine video clips 632 and/or moments 634 that populate a Master Clip Table (MCT) 630.

Figure 7:
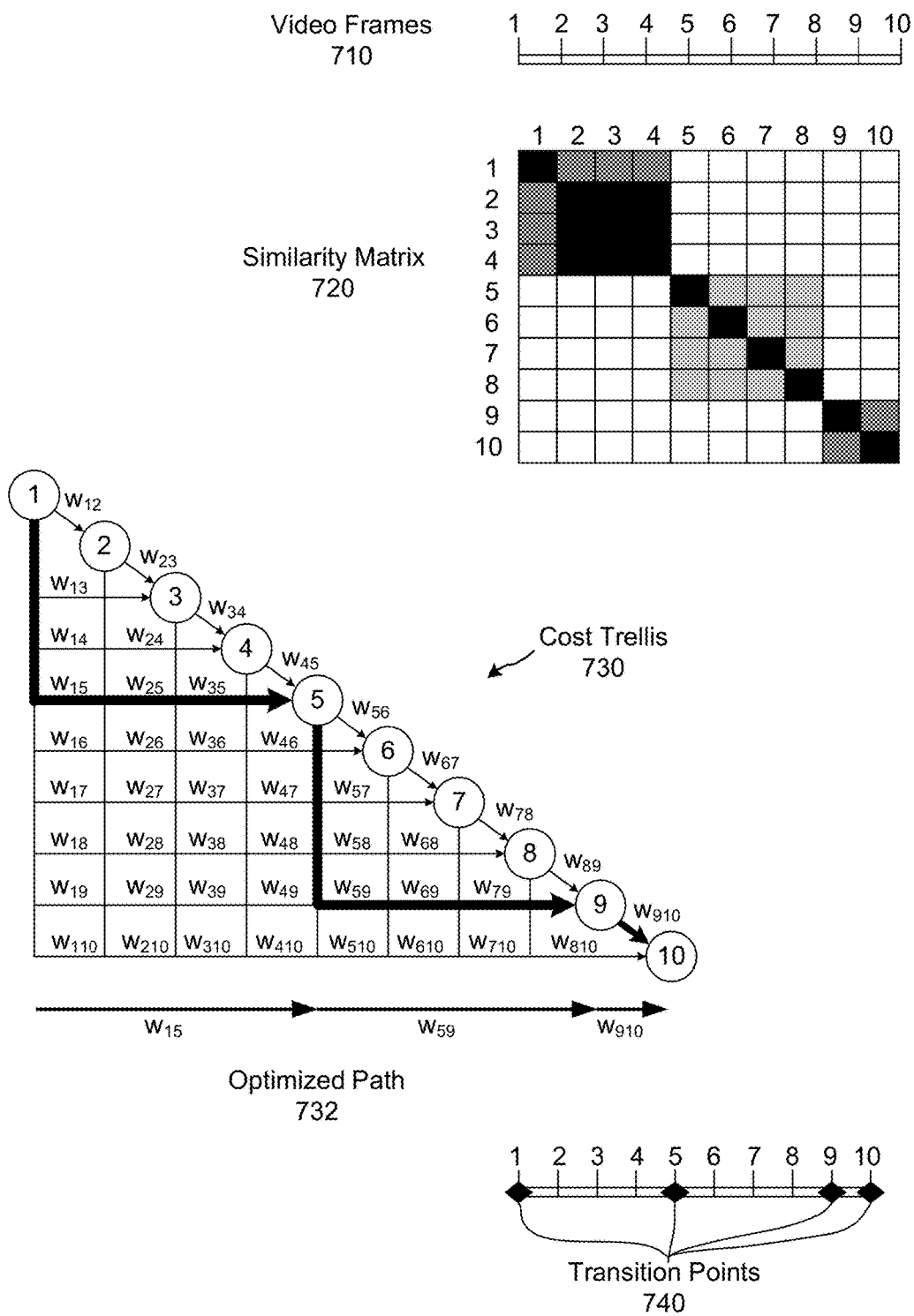
FIG. 7 illustrates an example of identifying transition points according to embodiments of the present disclosure.

FIG. 7 illustrates an example of identifying transition points according to embodiments of the present disclosure. As illustrated in FIG. 7, the server(s) 112 may identify transition points within the video data by grouping video frames based on a similarity score. For example, first video frames may be substantially similar while second video frames may be substantially similar, although the first video frames may be substantially different than the second video frames (e.g., a difference in similarity scores is above a threshold). The transition points may correspond to large changes in the video data, such as scene changes, movement, change in a number of faces detected or the like. In some examples, the server(s) 112 may identify the transition points using low-level image features such as color histograms, spatial correlation or the like, although the present disclosure is not limited thereto.

The server(s) 112 may use the transition points to identify scenes or other changes in the video data that may be used to determine a beginning or an end of a video clip. For example, a series of video frames (e.g., video frames 1-100) may have a priority metric above a threshold and the server(s) 112 may therefore determine that the series of video frames are interesting. However, a first portion of the video frames (e.g., video frames 1-40) may be substantially similar (e.g., difference in similarity scores is above a threshold) but substantially different than a second portion of the video frames (e.g., video frames 41-100). The server(s) 112 may determine a transition point between the first portion and the second portion (e.g., transition point at video frame 40) and may select the first portion as a first video clip and the second portion as a second video clip.

As illustrated in FIG. 7, the server(s) 112 may determine a similarity score between individual video frames of a portion of video data. For ease of explanation, FIG. 7 illustrates video frames 710 including 10 discrete video frames, and the server(s) 112 may determine a similarity score between each of the individual video frames. For example, the server(s) 112 may determine a first similarity score between video frame 1 and video frame 2, a second similarity score between video frame 1 and video frame 3, a third similarity score between video frame 1 and video frame 4 and so on until the server(s) 112 has determined a similarity score between every pair of video frames 710. The similarity scores may be determined using image features (e.g., color histograms) extracted from the video frames 710, spatial correlation, normalized cross-correlation (NCC) and/or motion vectors across the video frames 710. The similarity scores may be a numerical value between 0 and 1, with a similarity score of 0 indicating completely different video frames and a similarity score of 1 indicating identical video frames.

While the similarity scores are numerical values, FIG. 7 illustrates a similarity matrix 720 conceptually illustrating relative bands of similarity scores, with a darker color representing a higher similarity score. For example, an extremely high similarity score (e.g., 0.9 to 1.0) may be represented by a black square, a high similarity score (e.g., 0.75 to 0.9) may be represented by a dark grey square, a medium similarity score (e.g., 0.25 to 0.75) may be represented by a light grey square and a low similarity score (e.g., 0 to 0.25) may be represented by a white square. As illustrated in the similarity matrix 720, a black diagonal line runs from top left to bottom right, indicating that the video frames are identical to themselves (e.g., video frame 1 is identical to video frame 1, video frame 2 is identical to video frame 2, etc.).

Based on the similarity scores, the server(s) 112 may separate the video frames 710 into several groups of video frames having similarity scores above a threshold. For example, video frames 2-4 are identical to each other and have a strong similarity to video frame 1, video frames 5-8 have a medium similarity, and video frame 9 has a strong similarity to video frame 10. Therefore, the server(s) 112 may group the video frames 710 in various configurations based on a number of transition points for the video data. For example, in a first configuration the server(s) 112 may group the video frames 710 as video frame 1, video frames 2-4, video frames 5-8 and video frames 9-10, corresponding to five transition points. In a second configuration, the server(s) 112 may group the video frames 710 as video frames 1-4, video frames 5-8 and video frames 9-10, corresponding to four transition points. To determine the optimal number of transition points, the server(s) 112 may generate a cost trellis 730.

To generate the cost trellis 730, the server(s) 112 may determine a cost of introducing a transition point across the video frames 710. For example, the server(s) 112 may determine a cost $w_{12}$ between video frame 1 and video frame 2, a cost $w_{13}$ between video frame 1 and video frame 3, a cost $w_{14}$ between video frame 1 and video frame 4 and so on until a cost $w_{910}$ between video frame 9 and video frame 10. The server(s) 112 may determine the costs based on individual similarity scores in the similarity matrix 720. To determine the transition points, the server(s) 112 may determine an optimal path between video frame 1 and video frame 10 in the cost trellis 730. For example, the server(s) 112 may determine that a cost $w_{15}$ between video frame 1 and video frame 5 is lower than a cost $w_{16}$ between video frame 1 and video frame 6 as video frame 6 is not similar to video frames 1-4 (e.g., similarity score is below a threshold) but is similar to video frame 5 (e.g., similarity score is above the threshold).

To determine the optimal path, the server(s) 112 may use an optimization algorithm to minimize an overall cost associated with the video frames 710. In some examples, the overall cost may be determined by summing individual costs from video frame 1 to video frame 10. As illustrated in FIG. 7, for example, the optimized path 732 may include cost $w_{15}$ between video frame 1 and video frame 5, cost $w_{59}$ between video frame 5 and video frame 9 and cost $w_{910}$ between video frame 9 and video frame 10. Based on the optimized path 732, the server(s) 112 may determine transition points 740, which include a first transition point at video frame 1 (beginning of the video clip), a second transition point at video frame 5 (separating video frame 4 and video frame 5), a third transition point at video frame 9 (separating video frame 8 and video frame 9) and a fourth transition point at video frame 10 (end of the video clip). Thus, the server(s) 112 may group video frames 1-4, video frames 5-8 and video frames 9-10.

The server(s) 112 may determine a total number of transition points based on a length of the video data, a size of the similarity matrix 720, a computational budget available on the server(s) 112 or the like. If there were additional transition points available, the server(s) 112 may determine an additional transition point at video frame 2 (separating video frame 1 and video frame 2) and/or video frame 9 (separating video frame 9 from video frame 10). However, the similarity score between video frames 1-2 and 9-10 are relatively high and the server(s) 112 may simplify the optimized path 732 by removing the additional transition points.

FIGS. 8A-8C illustrate examples of receiving annotation data and generating visualization charts according to embodiments of the present disclosure. As illustrated in FIG. 8A, the clip generator 602 may receive annotation data 610 including object data 812, motion data 814, audio data 816, inertial measurement unit (IMU) data 818, and video tags 820, although the disclosure is not limited thereto and includes the annotation data described in greater detail above with regard to FIGS. 3-5C. The object data 812 may indicate an existence and/or position of objects, faces, humans, smiles or the like. For example, the object data 812 may indicate x coordinate(s) associated with a face for individual video frames where the face is represented. The motion data 814 may indicate relative motion represented in the video data, such as motion vectors embedded in the video data associated with objects in motion or camera movement. The IMU data 818 may indicate if the image capture device 110 is moving, static, handheld, etc. during portions of the video data. The video tags 820 may include additional annotation data input by a user of the image capture device 110 and/or the device 102.

Using the annotation data 610, the clip generator 602 may generate charts 830 indicating a position of the annotation data 610 in both time (e.g. y axis) and space (e.g., x axis). To generate the chart 830, the server(s) 112 may ignore a vertical position within a video frame and may instead determine the position based on a horizontal position within the video frame. For example, a first face may appear in the chart 830 at a first position and a second face may appear in the chart 830 at a second position when the first face and the second face are oriented side by side (e.g., first face at coordinates (1000, 500), second face at coordinates (1200, 500)), whereas the first face and the second face may appear in the chart 830 at the first position when the first face and the second face are oriented top and bottom (e.g., first face at coordinates (1000, 500), second face at coordinates (1000, 700)). FIGS. 8B-8C illustrate examples of charts 830 generated by the clip generator 602. However, the charts 830 are included to conceptually illustrate how the clip generator 602 determines video clips and the disclosure is not limited thereto. For example, the clip generator 602 may determine video clips without generating the charts 830.

FIG. 8B illustrates a panoramic image 840 including a first face 842, a second face 844, a pet 846 and a television 848. The panoramic image 840 corresponds to a video frame of video data and a position of the first face 842, the second face 844, the pet 846, the television 848 and other objects represented in the panoramic image 840 and included in the annotation data may be tracked over a plurality of video frames, as illustrated by position chart 832. For example, the position chart 832 may include trackings 850, which include a first tracking 852 corresponding to the first face 842, a second tracking 854 corresponding to the second face 844 and a third tracking 856 that may correspond to an object represented in the video data intermittently for short periods of time, such as the pet 846. Some objects, such as the television 848, may be included in the position chart 832 despite being stationary throughout the video data. Thus, the server(s) 112 may identify specific identities, people, faces, objects, pets, locations, landmarks or the like in the video data (collectively referred to as "objects"), may determine locations associated with the identified objects in the plurality of video frames and may store the locations corresponding to the identified objects in the annotation data. Using the annotation data, the clip generator 602 may generate the position chart 832 to visually indicate the locations associated with the identified objects over time.

As illustrated by the position chart 832, the first tracking 852 starts at a first position at a first time and moves to the right to a second position at a second time, while the second tracking 854 remains relatively close to a third position from the first time to the second time. Thus, the first face 842 is represented in the video data beginning at the first position in a first video frame and ending at the second position in a final video frame, while the second face 844 is represented in the video data in approximately the third position in the first video frame and the final video frame. In contrast, the third tracking 856 appears and disappears intermittently, indicating that the object (e.g., pet 846) is represented in the video data near a fourth position for a number of video frames before moving out of view. Additional trackings 850 are illustrated in the position chart 832, corresponding to additional objects represented in the video data and/or other annotation data corresponding to a specific position in the video data.

Based on the position chart 832, the server(s) 112 may track individual objects represented in the video data over a plurality of video frames. The server(s) 112 may generate a priority metric associated with each of the objects represented in the position chart 832 and may associate the priority metric with the trackings 850. For example, the server(s) 112 may determine that the second face 844 is associated with a relatively high priority metric (e.g., the second face 844 is determined to be interesting) and may associate the positions indicated by the second tracking 854 with the high priority metric. FIG. 8C illustrates an example conceptually illustrating a priority metric chart 834 generated based on the priority metrics. In the priority metric chart 834 illustrated in FIG. 8C, a high priority metric may be represented as a darker color (e.g., extremely high priority metric may correspond to black) while a low priority metric may be represented as a lighter color (e.g., extremely low priority metric may correspond to white). For example, the second tracking 854 may correspond to a second tracking 864 that maintains a consistently high priority metric from the first video frame to the final video frame, as illustrated by a relatively thick black line in the priority metric chart 834.

In some examples, the server(s) 112 may associate different priority metrics with an object over time, such as when a face is obscured, hidden and/or turned away from the image capture device 110. For example, the first tracking 852 may correspond to a first tracking 862 that varies over time, as illustrated by first portions corresponding to a high priority metric (e.g., dark portions, which may correspond to the first face 842 being fully represented in the video data) and second portions corresponding to a low priority metric (e.g., light portions, which may correspond to the first face 842 being only partially represented in the video data). The third tracking 856 may correspond to third tracking 866 that has a relatively high priority metric (e.g., thick black line) over the short duration that the object (e.g., pet 846) is represented in the video data. In some examples, such as when the television 848 is powered off, the server(s) 112 may associate the television 848 with a low priority metric and therefore a corresponding tracking may appear as a faint line in the priority metric chart 834. However, the disclosure is not limited thereto. Instead, the server(s) 112 may determine that the television 848 is powered on and/or that the first face 842 or the second face 844 interact with the television 848 for a period of time and may associate the television 848 with a high priority metric for the period of time without departing from the disclosure.

In addition to the trackings 862/864/866 corresponding to the trackings 852/854/856 described above with regard to the position chart 832, the priority metric chart 834 includes additional trackings 860. For example, the priority metric chart 834 illustrates a heat map based on the priority metrics determined using annotation data, with sporadic dark lines corresponding to various objects represented in the video data for short periods of time. For ease of illustration, some of the trackings 860 do not correspond to trackings 850 illustrated in the position chart 832. However, in practice any tracking 860 included in the priority metric chart 834 would correspond to a tracking 850 included in the position chart 832.

Figure 9A:
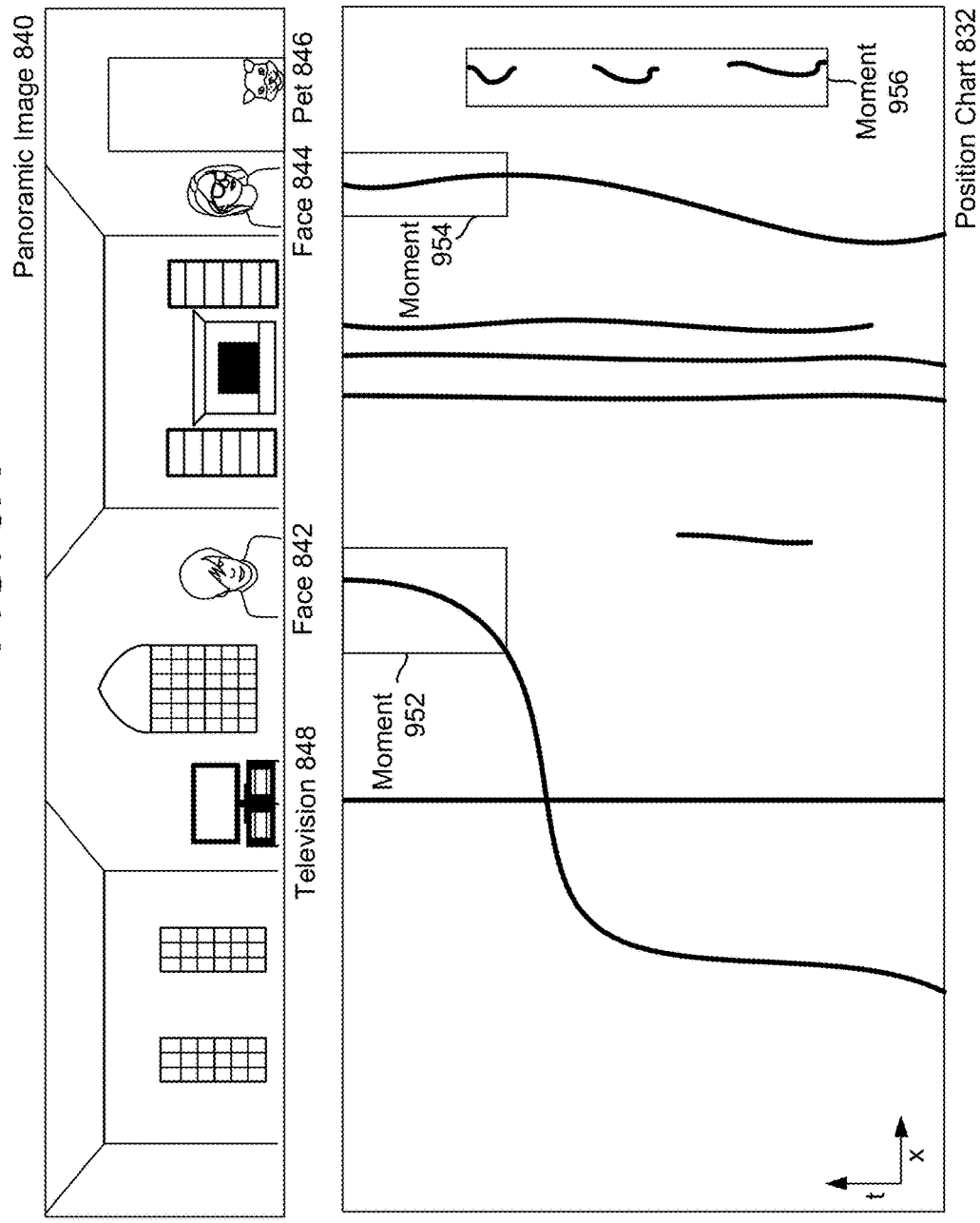
Figure 9B:
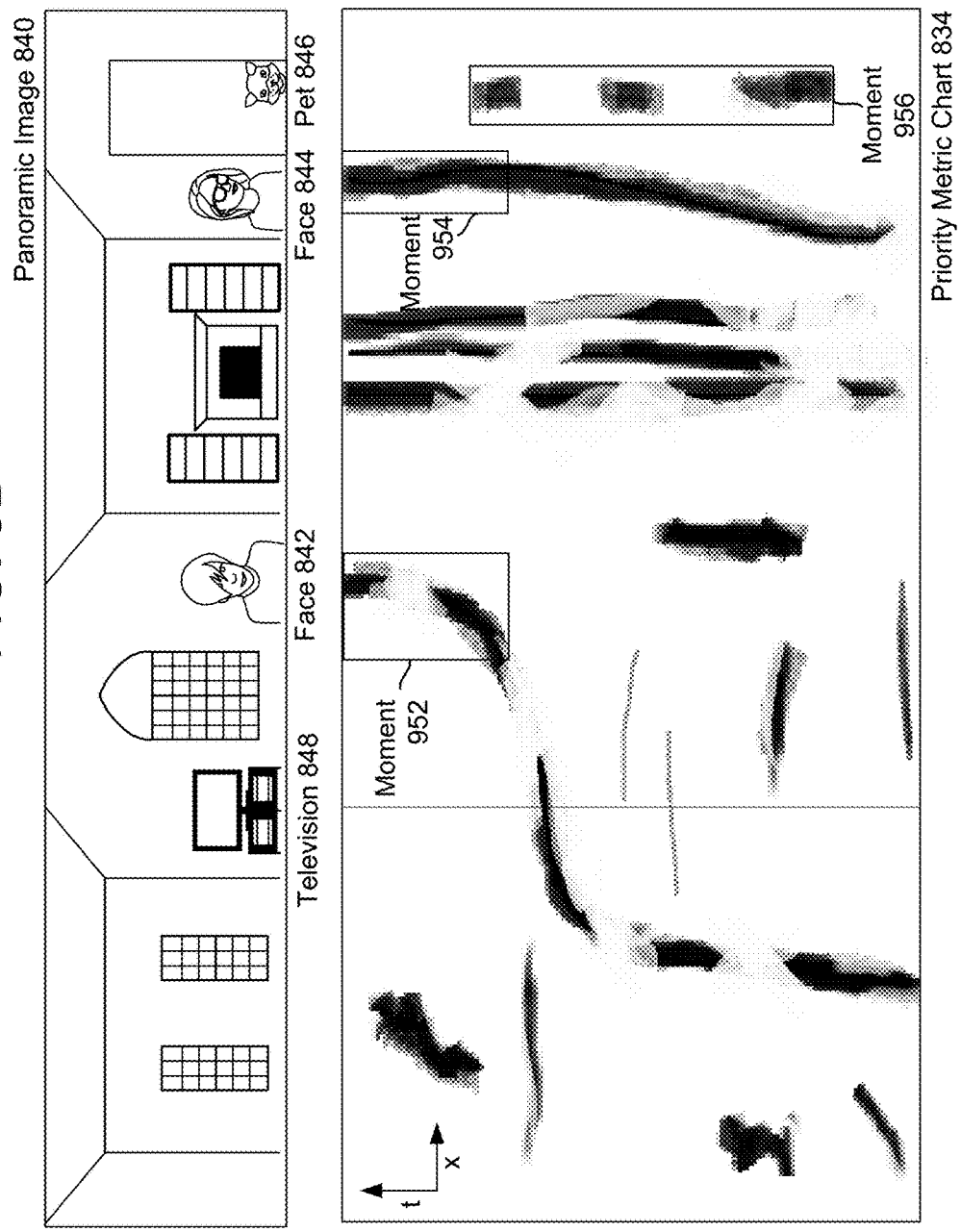

After generating the charts 830 (e.g., position chart 832 and/or priority metric chart 834), the server(s) 112 may determine moments and/or video clips included in the video data based on the charts 830. FIGS. 9A-9C illustrate examples of moments according to embodiments of the present disclosure. As illustrated in FIGS. 9A-9B, the server(s) 112 may use the position chart 832 and/or the priority metric chart 834 to identify a first moment 952, a second moment 954 and/or a third moment 956. The moments 952/954/956 may correspond to at least a portion of trackings 852/854/856. For example, the first moment 952 may correspond to a portion of the first tracking 852 associated with the second position over a first duration of time and the second moment 954 may correspond to a portion of the second tracking 854 over the first duration of time. Thus, despite the first face 842 and the second face 844 being continually represented in the video data (e.g., first tracking 852 and second tracking 854 extend from bottom to top in the position chart 832) the first moment 952 and the second moment 954 may correspond to only a portion of the video data and/or first tracking 852/second tracking 854. In contrast, the third moment 956 may correspond to a second duration of time associated with an entirety of the third tracking 856, such as when the pet 846 appears in the doorway repeatedly, without departing from the disclosure.

The server(s) 112 may select the moments 952/954/956 based on the position chart 832 and/or the priority metric chart 834. For example, in some examples the first moment 952 may be selected based on a proximity between the first face 842 and the second face 844 in the position chart 832. Additionally or alternatively, in other examples the first moment 952 may be selected based on the priority metrics illustrated by the tracking 862 exceeding a threshold and/or priority metrics within a region of the priority metric chart 834 exceeding the threshold. Various techniques of selecting priority metrics exceeding a threshold will be described in greater detail below with regard to FIGS. 10-11B. In addition to identifying moments in the video data, the server(s) 112 may identify video clips including one or more moments.

FIG. 9C illustrates an example of a video clip annotated with two moments, which are tracked over the course of the video clip. As illustrated in FIG. 9C, a video clip 960 may be 10 seconds long and may include a field of view of 360 degrees. In a first video frame (e.g., Frame 1), the first face 842 is at a first position and the second face 844 is at a second position. As the video clip progresses, the first face 842 travels in a first direction towards the second position and the second face 844 travels in a second direction towards the first position. The first face 842 and the second face 844 meet in a third video frame (e.g., Frame 3) and, remaining in proximity to each other, both move in the first direction (e.g., Frame 5 and Frame 6). The server(s) 112 may annotate the video clip 960 with two moments, a first moment 962 associated with the first face 842 (e.g., bounding box surrounding the first face 842) and a second moment 964 associated with the second face 844 (e.g., bounding box surrounding the second face 844). In some examples, the server(s) 112 may annotate the video clip 960 with a third moment indicating positions and/or video frames where the first face 842 and the second face 844 are in proximity. For example, the third moment may be a bounding box including the first face 842 and the second face 842 in Frames 3-6.

As discussed above, the server(s) 112 may select moments and/or video clips from the video data based on priority metrics. As an illustrative example, the server(s) 112 may generate priority metric graphs representing the individual priority metrics and may select a moment/video clip from the video data corresponding to a peak in the priority metric graph. FIG. 10 illustrates examples of priority metric graphs according to embodiments of the present disclosure. As illustrated in FIG. 10, the video data 1010 extends from a begin time (e.g., 0 seconds) to an end time (e.g., 30 seconds). Using annotation data associated with the video data 1010, the server(s) 112 may generate a first priority metric graph 1020-1 and/or a second priority metric graph 1020-2. For example, the server(s) 112 may retrieve existing priority metrics stored in the annotation data and/or may generate the priority metrics using the annotation data. In some examples, the priority metric values may correspond to an entirety of the video frame, including any moments represented in the video frame regardless of position. Additionally or alternatively, the priority metric values may correspond to a portion of the video frame, such as a single moment or a region of interest within the video frame, and may be used to select video frames having a highest priority metric for each moment/region of interest.

As illustrated in FIG. 10, a first priority metric graph 1020-1 is illustrated as a bar graph including individual bars corresponding to individual priority metric values. A priority metric value may be associated with a single video frame or a series of video frames, in which case the bars included in the first priority metric graph 1020-1 may be determined using quantization. For example, the server(s) 112 may segment the video frames and determine individual priority metric values corresponding to individual segments, reducing a computational load and/or smoothing the first priority metric graph 1020-1. A second priority metric graph 1020-2 is illustrated as a line chart based on the individual priority metric values, which may also be associated with a single video frame or a series of video frames. The second priority metric graph 1020-2 may indicate raw priority metric values or may be a mathematical function (e.g., line of best fit) determined based on the raw priority metric values, for example to smooth the data. While FIG. 10 illustrates the priority metric graphs 1020 using a bar chart and a line chart, the present disclosure is not limited thereto and the server(s) 112 may generate the priority metric graphs 1020 using any techniques known to one of skill in the art without departing from the disclosure. Additionally or alternatively, the server(s) 112 may determine peaks from individual priority metric values associated with the video data 1010 without generating a priority metric graph 1020 without departing from the disclosure.

The priority metric graphs 1020 indicate a priority metric value associated with individual video frames included in the video data 1010. For example, the priority metric graphs 1020 may include a priority metric value corresponding to each video frame included in the video data 1010, an average of every n video frames (where n is a natural number), a sampling every n video frames, and/or a variable sampling (e.g., based on motion data, changes to the annotation data or the like), although the present disclosure may vary. As illustrated in priority metric graphs 1020, the priority metric values vary over time, with relative peaks (e.g., the 2 second mark, the 6 second mark, the 12 second mark, the 18 second mark, the 22 second mark, 26 second mark and the 30 second mark) and intervening valleys.

The server(s) 112 may identify the relative peaks using mathematical techniques known to one of skill in the art. In some examples, the server(s) 112 may determine a threshold to identify relative peaks that are interesting (e.g., highest peaks, above average peaks or the like). For example, the server(s) 112 may calculate a threshold (e.g., a horizontal line associated with a fixed priority metric value) and determine relative peaks exceeding the threshold. The server(s) 112 may calculate the threshold as a global threshold (e.g., universal threshold for multiple video segments/ video clips included in the video data), a local threshold (e.g., individual threshold associated with a single video segment/video clip) or a variable threshold (e.g., variable threshold based on the average priority metric value within a range (e.g., time window). For example, the server(s) 112 may determine a fixed threshold (not shown) for the video data 1010 and may determine the relative peaks exceeding the fixed threshold (e.g., the 6 second mark, the 12 second mark, 26 second mark and the 30 second mark). Thus, the server(s) 112 may identify four moments of interest in the video data 1010 and may generate one or more video snippets from the moments of interest.

In some examples, the priority metric graphs 1020 may not be as smooth as the examples illustrated in FIG. 10 and the server(s) 112 may need to identify spikes in the priority metric graphs 1020. A spike in the priority metric graph 1020 may indicate a series of video frames that are interesting relative to neighboring video frames, corresponding to a brief moment of interest that may be extracted as a moment and/or video clip. For example, in some examples a peak in the priority metric graph 1020 may correspond to an interesting moment but may extend for a relatively long period of time (e.g., 20+ seconds), which may be difficult to extract as a video clip (e.g., the interesting aspect of the peak extends over time and truncating the peak to generate a video clip removes proper context). In contrast, a short peak (e.g., spike) may extend for a relatively short period of time (e.g., 1-10 seconds) and may retain context as a video clip. To identify spikes in the priority metric graph 1020, the server(s) 112 may use a variable threshold. Thus, instead of using a fixed threshold associated with the video data 1010 from 0 seconds to 30 seconds, the server(s) 112 may divide the video data 1010 into multiple sections and determine individual thresholds associated with each section. For example, the server(s) 112 may divide the video data 1010 into fixed sections based on time (e.g., from 0 seconds to 10 seconds, 10 seconds to 20 seconds, etc.), multiple variable sections based on peaks (e.g., from first peak to second peak, from second peak to third peak, etc.), multiple variable sections including portions of the valleys (e.g., beginning of first valley to end of first valley, beginning of second valley to end of second valley, etc.) or the like. Additionally or alternatively, the server(s) 112 may determine the threshold using a running average (e.g., average priority metric values over 5 seconds) or the like to determine where the priority metric graph 1020 spikes relative to surrounding video frames.

FIGS. 11A-11B illustrate examples of selecting video clips according to embodiments of the present disclosure. As illustrated in FIG. 11A, the server(s) 112 may identify video clips of variable length from the video data 1110. For example, the server(s) 112 may generate the priority metric graph 1120 corresponding to the video data 1110 and may determine video clips 1130 (e.g., video clips A-D) based on peaks in the priority metric graph 1120. Thus, the individual video clips 1130 may have variable lengths of time based on a length of the corresponding peak in the priority metric graph 1120. In some examples, the server(s) 112 may determine the video clips 1130 based on a height of a corresponding peak and may ignore portions of the video data 1110 associated with low priority metrics. For example, the portion of the video data 1110 between video section C and video section D is associated with priority metrics below a threshold and therefore omitted from the video clips 1130. However, the present disclosure is not limited thereto and the sever(s) 112 may determine video clips 1130 corresponding to an entirety of the video data 1110 without departing from the disclosure.

As discussed above with regard to FIG. 10, the server(s) 112 may identify relative peaks to associate with moments/ video clips based on a global threshold and/or variable threshold. For example, every peak above the threshold may be determined to be interesting and associated with a moment/video clip (e.g., video clips A, B, C and D illustrated in FIG. 11A are selected and associated with corresponding moments/video clips as corresponding peaks exceed the threshold). However, in some examples the server(s) 112 may determine moments and/or video clips based on the priority metrics and similarity scores between different portions of the video data. For example, as discussed above with regard to FIG. 7, the server(s) 112 may identify transition points within the video data and may group video frames based on similarity scores. The server(s)

112 may select a desired number of peaks from each group of video frames to increase a diversity between moments/video clips generated by the server(s) 112.

FIG. 11B illustrates an example of determining moments/video clips based on the priority metrics and the similarity scores according to embodiments of the present disclosure. As illustrated in FIG. 11B, the server(s) 112 may determine transition points using similarity scores and may determine similarity segments 1140 based on the transition points. For example, a first similarity segment 1140-1 may include a first peak, a second similarity segment 1140-2 may include second and third peaks, a third similarity segment 1140-3 may include fourth and fifth peaks and a fourth similarity segment 1140-4 may include sixth and seventh peaks.

Using the global threshold, the server(s) 112 may select video clips 1150 including video clips A-D. However, video clips B and C are both included in the second similarity segment 1140-2 and may be similar to each other. In some examples, the server(s) 112 may only select a desired number of moments/video clips from each similarity segment 1140 to increase a diversity between moments/video clips, which may result in a first peak in a first similarity segment being omitted while a second peak in a second similarity segment, with a lower overall peak value, is selected. For example, the server(s) 112 may select a single peak from each of the similarity segments 1140. Thus, even though the second peak (corresponding to video clip B) has a higher priority metric value than the first peak (corresponding to video clip A) and the sixth peak (corresponding to video clip D), the second peak has a lower priority metric value than the third peak (corresponding to video clip C). Therefore, as both the second peak and the third peak are within the second similarity segment 1140-2, the server(s) 112 may select only the third peak (e.g., video clip C) and may ignore the second peak (e.g., video clip B).

FIGS. 12A-12C illustrate examples of selecting portions of video data in time and/or space according to embodiments of the present disclosure. As illustrated in FIG. 12A, the server(s) 112 may select portions of the video data 1210 (e.g., moments and/or video clips) in time. For example, the video clip data 1220 may include an entire field of view of the video data 1210 (e.g., panoramic field of view or the like) for a portion of the overall time period, indicated by video clips A-E corresponding to unique periods of time within the video data 1210. While the video clip data 1220 is illustrated as being the same size as the video data 1210 (e.g., similar heights in a vertical dimension corresponding to size per second), the present disclosure is not limited thereto. For example, while the video clip data 1220 may include the entire field of view of the video data 1210, the video clip data 1220 may have a lower resolution than the video data 1210 to reduce a size of the video clip data 1220.

As illustrated in FIGS. 12B-12C, the server(s) 112 may select portions of the video data 1210 (e.g., moments and/or video clips) in space. Thus, the video data 1210 may include a first field of view and the video clip data 1222/1224 may include a second field of view smaller than the first field of view. For example, a first resolution of the video data 1210 may include the full first field of view and include 5200 pixels in a horizontal direction (e.g., along the x axis) and 1080 pixels in a vertical direction (e.g., along the y axis), while a second resolution of the video clip data 1222/1224 may include a cropped second field of view and include 3200 pixels in the horizontal direction and 720 pixels in the vertical direction. The second field of view (e.g., second resolution) is not limited to a specific resolution and/or aspect ratio, however, and may be determined based on objects represented in the video data 1210. For example, motion data may be present in only a portion of the video data 1210 while the remainder of the video data 1210 is static, such as when the image capture device 110 is placed near a wall or other obstruction. Therefore, only the portion of the video data including the motion data may be selected by the server(s) 112 to be included in the video clip data 1222/1224. However, the video clip data 1222/1224 may be selected using a specific resolution and/or fixed aspect ratio without departing from the present disclosure. In addition to the video clip data 1222/1224 including the second field of view smaller than the first field of view, the video clip data 1222/1224 may decrease a resolution of the video clip data 1222/1224 relative to the video data 1210. For example, the video data 1210 may have a first pixel density (e.g., lines per inch) and the video clip data 1222/1224 may have a second pixel density smaller than the first pixel density.

FIG. 12B illustrates the video clip data 1222 selecting portions of the video data 1210 using a fixed framing window. For example, the image capture device 110 may be positioned near a wall or other obstruction and the video data 1210 may include static portions with no activity/movement or the like for the entirety of the video data 1210. Using the fixed framing window, the image capture device 110 may crop the video data 1210 to the video clip data 1222 uniformly to remove the static portions of the video data 1210.

In contrast to the fixed framing window illustrated in FIG. 12B, FIG. 12C illustrates the video clip data 1224 selecting portions of the video data 1210 using a dynamic framing window. Thus, the video data 1210 may correspond to a first field of view including dynamic objects/motion or the like but the video clip data 1224 may be selected to include only a portion of the first field of view. For example, the image capture device 110 may perform computer vision processing to identify objects of interest, motion or the like and may vary the dynamic framing window over time. Thus, the video clip data 1224 may include a second field of view based on the objects represented in the video data 1210. As illustrated in FIG. 12C, the second field of view may correspond to video clip data 1224-1 for a first video frame 1212-1, video clip data 1224-2 for a second video frame 1212-2 and video clip data 1224-3 for a third video frame 1212-3. However, the second field of view is not limited to a specific resolution and/or aspect ratio and may include additional portions of the video data 1210 to allow the server(s) 112 room to crop/pan/zoom within the video clip data 1224 when selecting a fixed aspect ratio.

FIG. 12C illustrates that the video clip data 1224 may select portions of the video data 1210 using a dynamic framing window. Typically, the dynamic framing window may track an object represented in the video data 1210, such as a person, a pet or the like, while the object is moving. However, in some examples the servers(s) 112 may determine that there is nothing specific in the video data 1210 to focus on and/or track but that the video data 1210 includes a region of interest. Therefore, the server(s) 112 may mark the video data 1210 as a candidate for an environmental shot, textural shot or the like and may pan across the video data 1210. Thus, instead of tracking an object represented in the video data 1210, the server(s) 112 may pan from a first position in the first video frame 1212-1 to a second position in the third video frame 1212-3 in order to include the region of interest to establish an environment and/or display scenery around the image capture device 110.

While FIG. 12A illustrates the server(s) 112 selecting portions of the video data 1210 in time and FIG. 12B-12C illustrates the server(s) 112 selecting portions of the video data 1210 in space, the server(s) 112 may select portions of the video data 1210 in time and space. For example, the video clip data may include portions of the video data 1210 in time (e.g., video clips corresponding to a period of time) and space (e.g., a portion of the panoramic field of view). In some examples, the server(s) 112 may determine the portion of the panoramic field of view to include for individual video clips. For example, a first video clip (e.g., beginning at a 1 minute mark of the video data 1210) may include the entire panoramic field of view, a second video clip (e.g., beginning at a 5 minute mark in the video data 1210) may include a fixed field of view within the panoramic field of view and a third video clip (e.g., beginning at a 10 minute mark in the video data 1210) may include a dynamic field of view within the panoramic field of view.

As part of generating a video clip, the server(s) 112 may determine virtual camera motion to simulate panning and zooming. For example, the server(s) 112 may determine a first framing window at a beginning of the video clip and a second framing window at an end of the video clip and may pan/zoom between the first framing window and the second framing window over a length of the video clip. As used hereinafter, for ease of explanation and to avoid confusion with a "video frame," a "framing window" may be referred to as a "cropped window" in reference to the video clip data. For example, a video frame may include image data associated with the video data and the server(s) 112 may determine a framing window within the image data associated with a cropped window. Thus, the cropped window may include a portion of the image data (e.g., cropped image) and dimensions of the cropped window may be smaller than dimensions of the video frame, in some examples significantly smaller. The output video data may include a plurality of cropped windows, effectively cropping the video data based on the framing windows determined by the server(s) 112.

Figure 13:
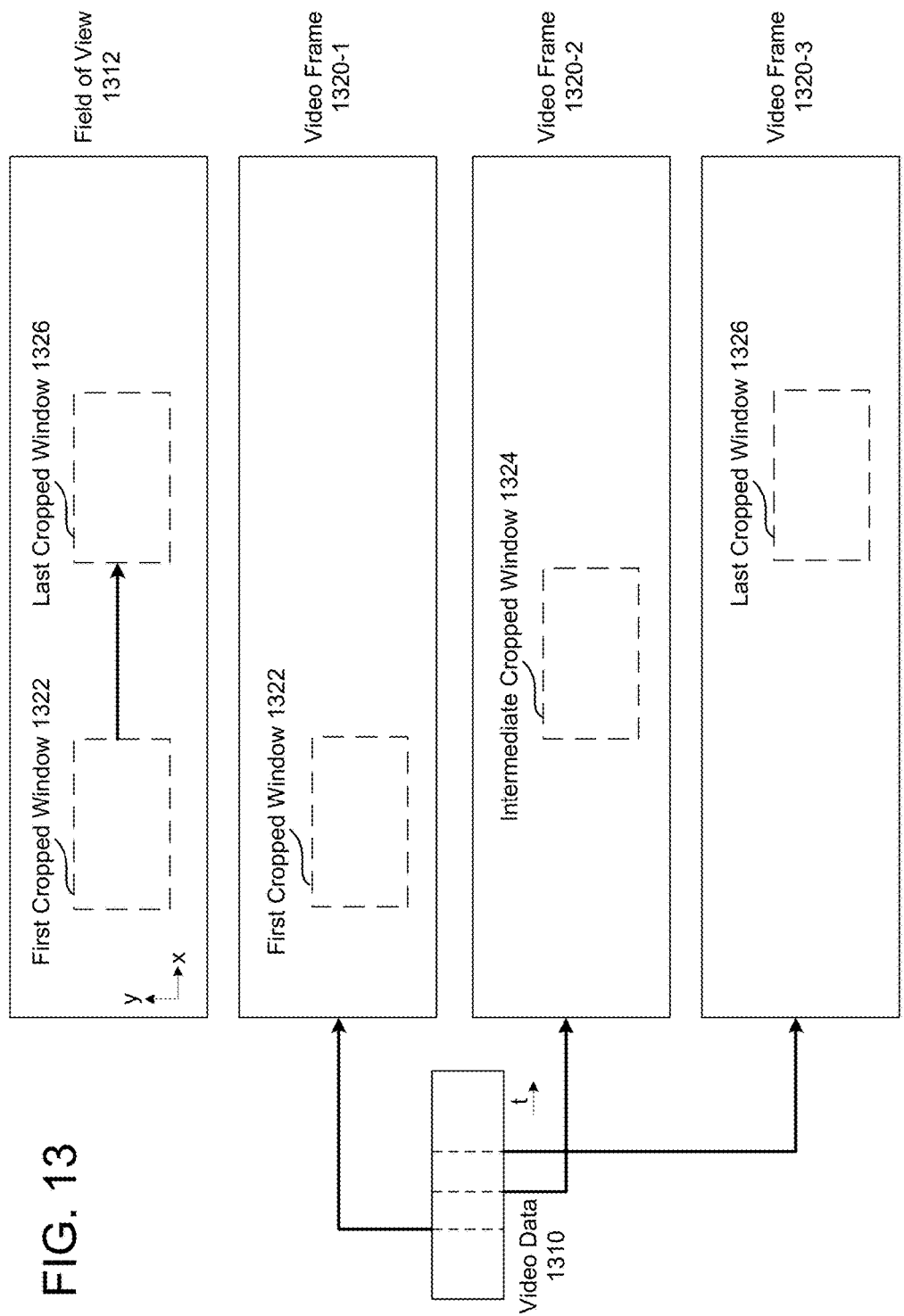
FIG. 13 illustrates an example of panning according to embodiments of the present disclosure.

FIG. 13 illustrates an example of panning according to embodiments of the present disclosure. As illustrated in FIG. 13, the server(s) 112 may pan from a first cropped window 1322 to a last cropped window 1326 within a field of view 1312 associated with video data 1310. For example, the field of view 1312 may include a plurality of pixels in an x and y array, such that each pixel is associated with x and y coordinates of the video data 1310. A first video frame 1320-1 includes first image data associated with a first time, a second video frame 1320-2 includes second image data associated with a second time and a third video frame 1320-3 includes third image data associated with a third time. To simulate panning, the server(s) 112 may determine a first cropped window 1322 in the first video frame 1320-1, an intermediate cropped window 1324 in the second video frame 1320-2 and a last cropped window 1326 in the third video frame 1320-3.

As illustrated in FIG. 13, the simulated panning travels in a horizontal direction (e.g., positive x direction) from a first location of the first cropped window 1322 through a second location of the intermediate cropped window 1324 to a third location of the last cropped window 1326. Therefore, the simulated panning extends along the x axis without vertical movements in the output video data, although the disclosure is not limited thereto. Further, as dimensions of the first cropped window 1322 are equal to dimensions of the intermediate cropped window 1324 and the last cropped window 1326, the output video data generated by the server(s) 112 will pan from left to right without zooming in or out.

While FIG. 13 illustrates a single intermediate cropped window 1324 between the first cropped window 1322 and the last cropped window 1326, the disclosure is not limited thereto and the output video data may include a plurality of intermediate cropped windows without departing from the present disclosure.

Figure 14:
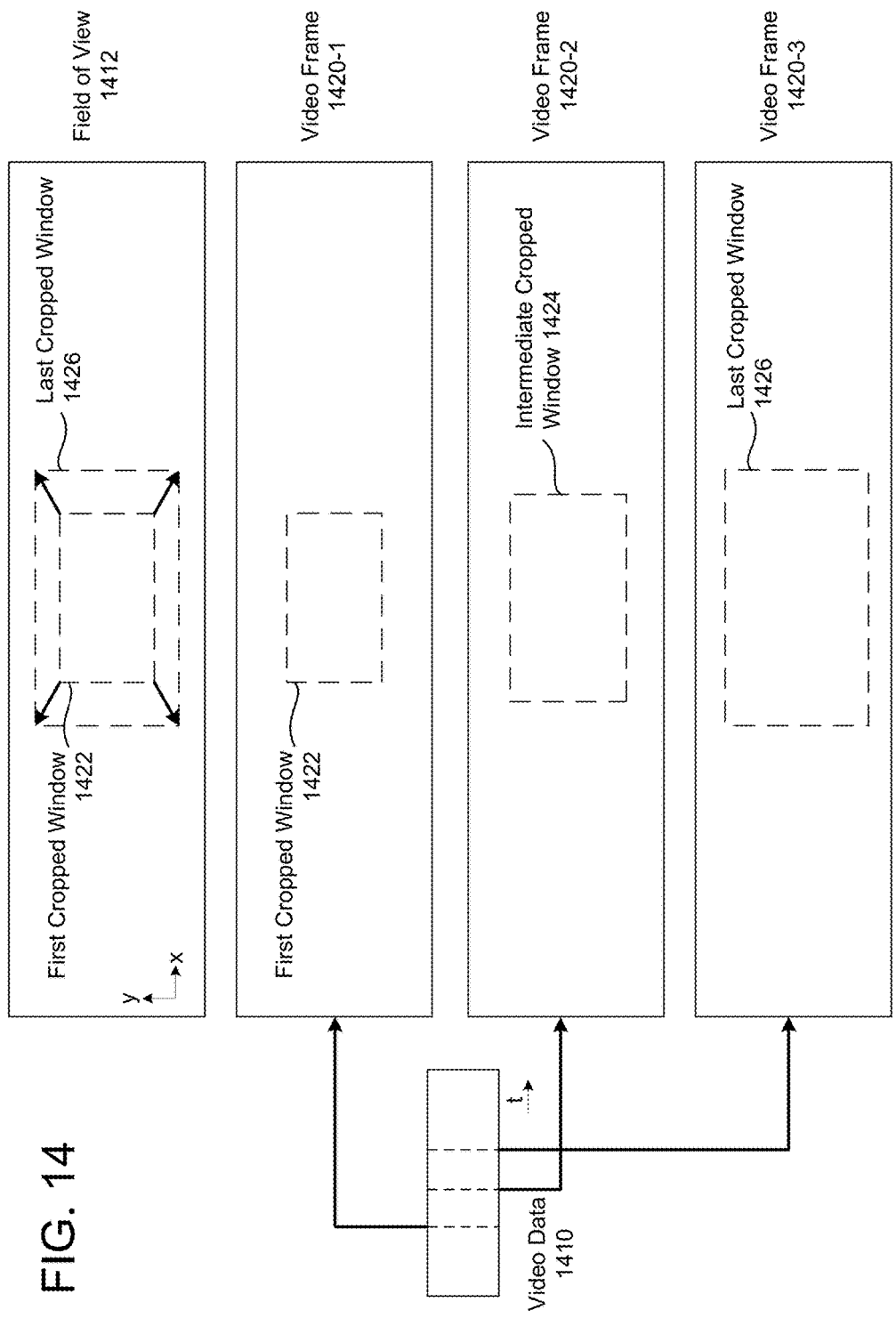
FIG. 14 illustrates an example of dynamic zooming according to embodiments of the present disclosure.

FIG. 14 illustrates an example of zooming according to embodiments of the present disclosure. As illustrated in FIG. 14, the server(s) 112 may zoom from a first cropped window 1422 to a last cropped window 1426 within a field of view 1412 associated with video data 1410. For example, the field of view 1412 may include a plurality of pixels in an x and y array, such that each pixel is associated with x and y coordinates of the video data 1410. A first video frame 1420-1 includes first image data associated with a first time, a second video frame 1420-2 includes second image data associated with a second time and a third video frame 1420-3 includes third image data associated with a third time. To simulate zooming, the server(s) 112 may determine a first cropped window 1422 in the first video frame 1420-1, an intermediate cropped window 1424 in the second video frame 1420-2 and a last cropped window 1426 in the third video frame 1420-3.

As illustrated in FIG. 14, the simulated zooming increases horizontal and vertical dimensions (e.g., x and y dimensions) from first dimensions of the first cropped window 1422 through second dimensions of the intermediate cropped window 1424 to third dimensions of the last cropped window 1426. Therefore, the output video data generated by the server(s) 112 will zoom out without panning left or right, such that the last cropped window 1426 may appear to include more content than the first cropped window 1422. In some examples, the server(s) 112 may determine an amount of magnification of the content within the framing window, such as determining dimensions of the framing window so that the content is included in 50% of the framing window. In some examples, the server(s) 112 may determine the amount of magnification without exceeding a threshold magnification and/or falling below a minimum resolution. For example, the server(s) 112 may determine a minimum number of pixels that may be included in the cropped windows to avoid pixilation or other image degradation. Therefore, the server(s) 112 may determine the minimum resolution based on user preferences or settings and/or pixel coordinates associated with an object/event of interest and may determine a size of the cropped windows to exceed the minimum resolution.

While FIG. 14 illustrates a single intermediate cropped window 1424 between the first cropped window 1422 and the last cropped window 1426, the disclosure is not limited thereto and the output video data may include a plurality of intermediate cropped windows without departing from the present disclosure.

Figure 15:
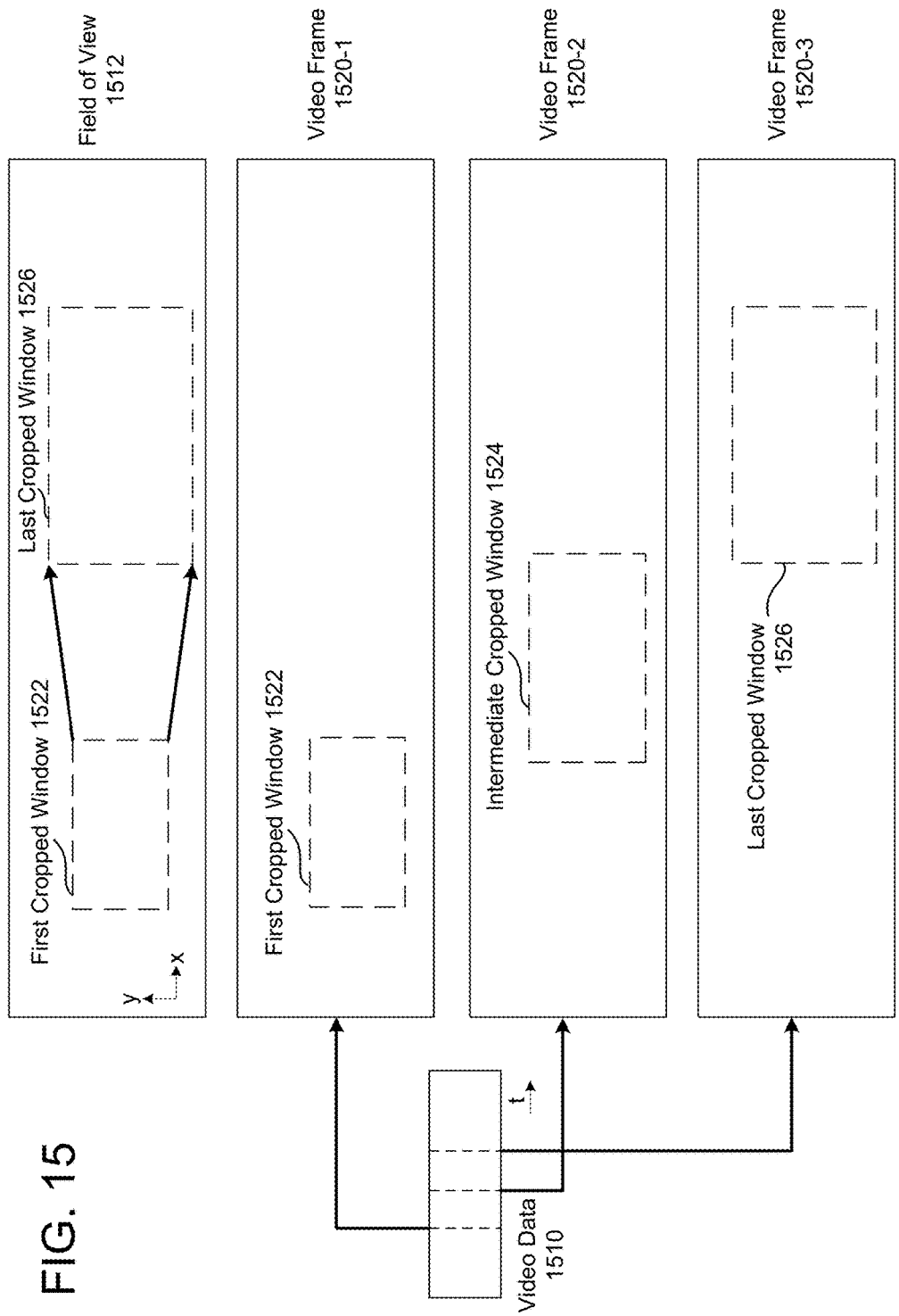
FIG. 15 illustrates an example of panning and zooming according to embodiments of the present disclosure.

FIG. 15 illustrates an example of panning and zooming according to embodiments of the present disclosure. As illustrated in FIG. 15, the server(s) 112 may pan and zoom from a first cropped window 1522 to a last cropped window 1526 within a field of view 1512 associated with video data 1510. For example, the field of view 1512 may include a plurality of pixels in an x and y array, such that each pixel is associated with x and y coordinates of the video data 1510. A first video frame 1520-1 includes first image data associated with a first time, a second video frame 1520-2 includes second image data associated with a second time and a third video frame 1520-3 includes third image data associated with a third time. To simulate both panning and zooming, the server(s) 112 may determine a first cropped window 1522 in the first video frame 1520-1, an intermediate cropped window 1524 in the second video frame 1520-2 and a last cropped window 1526 in the third video frame 1520-3.

As illustrated in FIG. 15, the server(s) 112 simulates panning by moving in a horizontal direction (e.g., positive x direction) between the first cropped window 1522, the intermediate cropped window 1524 and the last cropped window 1526. Similarly, the server(s) 112 simulates zooming by increasing horizontal and vertical dimensions (e.g., x and y dimensions) from first dimensions of the first cropped window 1522 through second dimensions of the intermediate cropped window 1524 to third dimensions of the last cropped window 1526. Therefore, the output video data generated by the server(s) 112 will zoom out while panning to the right, such that the last cropped window 1526 may appear to include more content than the first cropped window 1522 and may be associated with a location to the right of the first cropped window 1522. While FIG. 15 illustrates a single intermediate cropped window 1524 between the first cropped window 1522 and the last cropped window 1526, the disclosure is not limited thereto and the output video data may include a plurality of intermediate cropped windows without departing from the present disclosure.

While FIGS. 13-15 illustrate simulated panning and zooming, the server(s) 112 may use additional special effects to display multiple video clips simultaneously and/or transition between video clips. For example, the server(s) 112 may display a first video clip next to a second video clip in a single layout and may include special effects when transitioning to a second layout displaying a single video clip. Additionally or alternatively, the server(s) 112 may include transition effects when transitioning from a first video clip to a second video clip.

Figure 16D:

FIGS. 16A-16D illustrate examples of annotation data generated by the clip generator according to embodiments of the present disclosure. FIG. 16A illustrates a Master Clip Table (MCT) 1620 that includes Clips 1-7. The MCT 1620 may indicate which frames are associated with a video clip (e.g., Clip 1 may be associated with Frames 1-450, which corresponds to a 15 second video clip at 30 frames per second), a priority metric associated with the video clip, summary data (as discussed above with regard to FIG. 5B) associated with the video clip and/or a time/position of interesting moments within the video clip (e.g., pixel coordinates associated with individual timestamps corresponding to the moment).

In some examples, the user 10 may generate a video clip, which may be included in the MCT 1620 with or without annotation data. The server(s) 112 may annotate the user-generated video clip, although the present disclosure is not limited thereto. A moment may be a bounding box around an interesting object or section of the video clip over time. Additional data may be included about a moment, such as a per-frame interest rating, a position of a detected face, an identity of a detected face or the like.

The server(s) 112 may generate the MCT 1620 based on priority metrics determined from the annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT 1620.

In some examples, the MCT 1620 may include every video clip included in the video data (e.g., the video data is segmented into sequential video clips, each of which is included in the MCT 1620), but the disclosure is not limited thereto and the MCT 1620 may include only a portion of the video clips (e.g., interesting video clips associated with a portion of the video data). While the MCT 1620 illustrated in FIG. 16A includes video clips associated with a single sequential stream of video data (e.g., video captured at one time), the disclosure is not limited thereto. Instead, a MCT 1622 may include video clips associated with multiple streams of video data (e.g., video captured at more than one time, such as separate recordings) as illustrated in FIG. 16B. As illustrated in FIG. 16B, the MCT 1622 includes Clips 1-4 captured at a first time (e.g., capture date of Sep. 15, 2015) and Clips 50-52 captured at a second time (e.g., capture data of Sep. 24, 2015). Additionally or alternatively, the MCT 1622 may include video clips from separate recordings on the same date (e.g., first video recording at one point on Sep. 15, 2015, second video recording at a later point on Sep. 15, 2015) and/or video clips captured by multiple image capture devices 110 without departing from the disclosure.

FIG. 16C illustrates a detection results database 1630. Instead of including individual rows for individual video frames or groups of video frames, the detection results database 1630 includes individual rows for annotation data and indicates groups of video frames including the annotation data. For example, Face 1 may be associated with a first group of video frames (e.g., frames 1-150), a second group of video frames (e.g., frames 600-900), a third group of video frames (e.g., frames 1500-2000) etc. Thus, the detection results database 1630 indicates individual sections of the video data associated with the annotation data. Additionally or alternatively, the detection results database 1630 may indicate multiple groups of video frames in a single column without departing from the disclosure.

FIG. 16D illustrates a face database 1640 including a list of unique faces represented in the video data and indicating which video clips are associated with each of the individual faces. The server(s) 112 may analyze individual video clips using facial recognition (e.g., a facial recognition engine or the like) using Face Feature Vectors (which includes information that characterizes the appearance of individual faces under various poses and/or illuminations), may identify unique faces within each of the video clips, and may determine if the same face is detected in multiple video clips. For example, Face 1 is represented in Clip 1, Clip 2 and Clip 5 but not represented in Clip 3 and Clip 4. The server(s) 112 may include one or more images associated with individual faces (stored in the Face Feature Vector), or may access a database with images of individual faces in different poses. In some examples, an identity of an individual face may be determined (e.g., based on user input or using facial recognition processing) and stored in the face database 1640. In some examples, a first unique face represented in first video clips may be associated with a second unique face represented in second video clips and the information may be combined in the face database 1640. For example, a user 10 may be identified as a first unique face (e.g., Face 1 represented in Clips 1, 2 and 5) and a second unique face (e.g., Face 4 represented in Clip 3). Using identity information, user input, updated facial recognition processing or additional video data, the server(s) 112 may determine that the first unique face and the second unique face are associated with the user 10 and may merge Face 1 and Face 4. Thus, the face database 1640 may be updated over time based on subsequent processing. While FIG. 16D illustrates the face database 1640 indicating video clips associated with individual faces, the disclosure is not limited thereto and the face database 1640 may indicate video frames associated with the individual faces without departing from the disclosure.

FIG. 17 is a flowchart conceptually illustrating an example method for generating a master clip table according to embodiments of the present disclosure. As illustrated in FIG. 17, the server(s) 112 may receive (1710) annotation data associated with video data. The annotation data may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics and/or video tag(s) indicating characteristics corresponding to specific video frame(s). Examples of characteristics may include human identification, human body position, human activity, scene definition, areas of interest/non-interest, landmarks, or the like represented in the video data.

The server(s) 112 may determine (1712) priority metrics based on the annotation data. For example, the server(s) 112 may determine a priority metric (e.g., interesting score) for individual video frames within the panoramic video data using the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content.

The server(s) 112 may determine (1714) first priority metrics above a threshold and determine (1716) first video frames corresponding to the first priority metrics. For example, the threshold may be a global threshold and the server(s) 112 may identify all video frames associated with a priority metric exceeding the global threshold, although the disclosure is not limited thereto. In some examples, the server(s) 112 may select a series of first video frames, including some video frames associated with a priority metric below the threshold.

The server(s) 112 may select (1718) a first object represented in the first video frames and may determine (1720) first pixels associated with the first object. For example, the server(s) 112 may use the annotation data to identify an object or other characteristic represented in the first video frames and may determine positions of the object over time. The server(s) 112 may determine (1722) if there are additional objects, and if so, may loop (1724) to step 1718. If the server(s) 112 determines that no additional objects are represented in the video data, the server(s) 112 may determine (1726) a region of interest associated with the first pixels determined in step 1720. For example, three objects may be represented in the first video frames and the server(s) 112 may determine the region of interest to include the three objects.

The server(s) 112 may determine (1728) a beginning video frame from the first video frames, determine (1730) an ending video frame from the first video frames and may generate (1732) a video clip from the beginning video frame to the ending video frame. For example, the server(s) 112 may use transition points and/or other annotation data to identify a beginning and an end to the video clip.

The server(s) 112 may determine (1734) if there are additional video clips to include, such as additional video frames associated with a priority metric exceeding the threshold. If there are additional video clips, the server(s) 112 may loop (1736) to step 1714 and repeat steps 1714 to 1732 for the next video clip. If there aren't additional video clips, the server(s) 112 may generate (1738) a Master Clip Table (MCT) including entries associated with the generated video clips. The MCT may indicate which frames are associated with a video clip (e.g., Clip 1 may be associated with Frames 1-450, which corresponds to a 15 second video clip at 30 frames per second), a priority metric associated with the video clip, summary data (e.g., video fingerprint) associated with the video clip and/or a time/position of interesting moments within the video clip (e.g., pixel coordinates associated with individual timestamps corresponding to the moment).

Figure 18A:
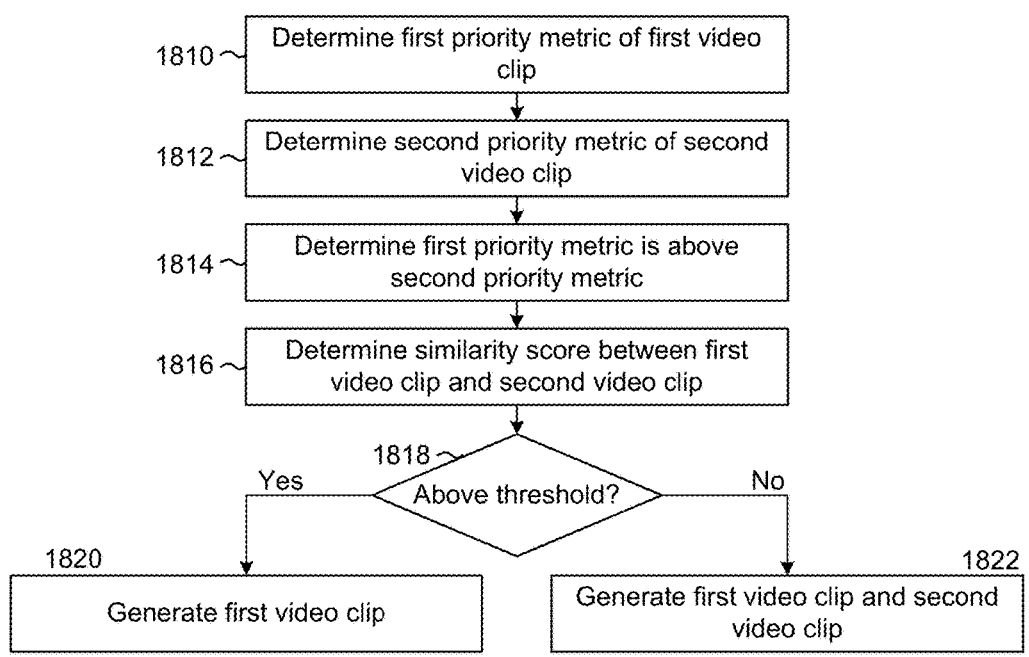
FIGS. 18A-18B are flowcharts conceptually illustrating example methods for increasing a diversity between video clips according to embodiments of the present disclosure.

FIG. 18A is a flowchart conceptually illustrating an example method for increasing a diversity between video clips according to embodiments of the present disclosure. As illustrated in FIG. 18, the server(s) 112 may determine (1810) a first priority metric of a first video clip and determine (1812) a second priority metric of a second video clip. The priority metrics may be an overall priority metric for the video clip, which may be determined based on an average priority metric, a peak priority metric, a sum of priority metrics or other techniques.

The server(s) 112 may determine (1814) that the first priority metric is above the second priority metric and may determine (1816) a similarity score between the first video clip and the second video clip. The server(s) 112 may determine the similarity score based on video "fingerprints" that indicate characteristics of the video clips that may be used to identify similar video clips. For example, the characteristics of the video clips may include feature vectors, histograms of image data, gradients of the image data, histograms of gradients, a signature of the image data or the like that may be used to determine if image data is similar between video clips. Additionally or alternatively, the server(s) 112 may determine the similarity scores using image features (e.g., color histograms) extracted from the video clips, spatial correlation, normalized cross-correlation (NCC) and/or motion vectors across the candidate video clips and/or individual video frames of the video clips.

The server(s) 112 may determine (1818) if the similarity score is above a threshold, indicating that the first video clip is substantially similar to the second video clip. If the similarity score is above the threshold, the server(s) 112 may generate (1820) only the first video clip, as the second video clip has a lower priority metric and contains similar content (e.g., redundant data). If the similarity score is below the threshold, the server(s) 112 may generate (1822) the first video clip and the second video clip, as the second video clip contains content not represented in the first video clip.

Figure 18B:
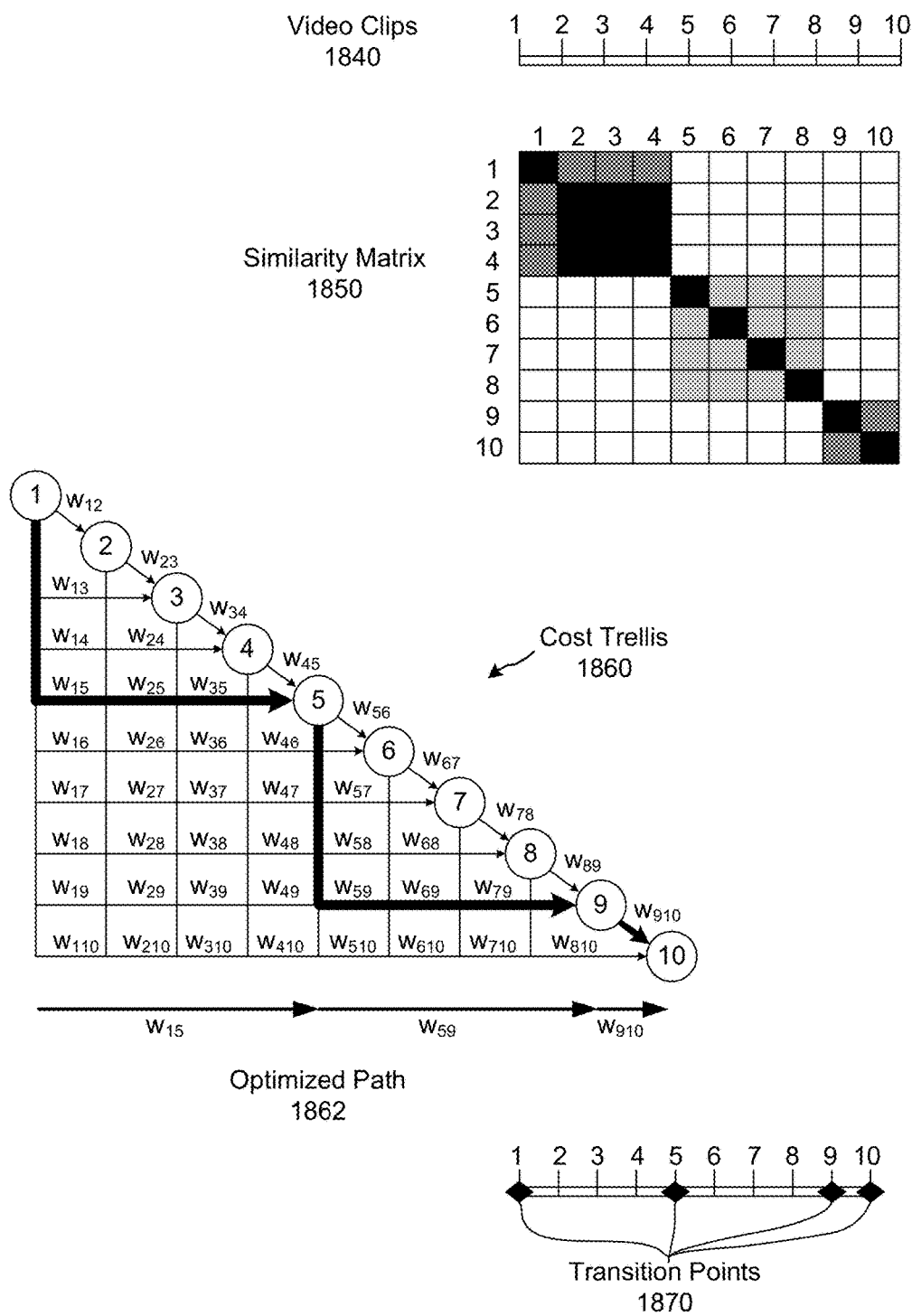

FIG. 18B illustrates an example of selecting video clips to increase a diversity between video clips. The example illustrated in FIG. 18 is similar to the example illustrated in FIG. 7 used to determine transition points by determining a similarity matrix between individual video frames. Instead of determining the similarity matrix between individual video frames, however, FIG. 18B illustrates determining a similarity matrix 1850 between individual video clips 1840. For example, first video clips (e.g., video clips 1-4) may be substantially similar while second video clips may be substantially similar (e.g., video clips 5-8), although the first video clips may be substantially different than the second video clips (e.g., a difference in similarity scores is above a threshold). The server(s) 112 may select video clips based on large changes in the video data, such as scene changes, movement, changes in a number of faces detected or the like. In some examples, the server(s) 112 may determine the similarity matrix 1850 using low-level image features such as color histograms, spatial correlation or the like, although the present disclosure is not limited thereto. Additionally or alternatively, the server(s) 112 may determine the similarity matrix 1850 using the annotation data.

As illustrated in FIG. 18B, the server(s) 112 may determine a similarity score between individual video clips 1840 (e.g., video clips 1-10). For ease of explanation, FIG. 18B illustrates video clips 1840 including 10 discrete video clips, and the server(s) 112 may determine a similarity score between each of the individual video clips. For example, the server(s) 112 may determine a first similarity score between video clip 1 and video clip 2, a second similarity score between video clip 1 and video clip 3, a third similarity score between video clip 1 and video clip 4 and so on until the server(s) 112 has determined a similarity score between every pair of video clips 1840. The similarity scores may be determined using image features (e.g., color histograms) extracted from the video clips 1840, spatial correlation, normalized cross-correlation (NCC), motion vectors across video frames in the video clips 1840 objects represented in the video clips 1840 and/or other annotation data associated with the video clips 1840. The similarity scores may be a numerical value between 0 and 1, with a similarity score of 0 indicating completely different video clips and a similarity score of 1 indicating identical video clips.

While the similarity scores are numerical values, FIG. 18B illustrates a similarity matrix 1850 conceptually illustrating relative bands of similarity scores, with a darker color representing a higher similarity score. For example, an extremely high similarity score (e.g., 0.9 to 1.0) may be represented by a black square, a high similarity score (e.g., 0.75 to 0.9) may be represented by a dark grey square, a medium similarity score (e.g., 0.25 to 0.75) may be represented by a light grey square and a low similarity score (e.g., 0 to 0.25) may be represented by a white square. As illustrated in the similarity matrix 1850, a black diagonal line runs from top left to bottom right, indicating that the video clips are identical to themselves (e.g., video clip 1 is identical to video clip 1, video clip 2 is identical to video clip 2, etc.).

Based on the similarity scores, the server(s) 112 may separate the video clips 1840 into several groups of video clips having similarity scores above a threshold. For example, video clips 2-4 are extremely similar to each other and have a strong similarity to video clip 1, video clips 5-8 have a medium similarity, and video clip 9 has a strong similarity to video clip 10. Therefore, the server(s) may select determine transition points between the video clips 1840 based on a total number of video clips to select. For example, in a first configuration the server(s) 112 may group the video clips 1840 as video clip 1, video clips 2-4, video clips 5-8 and video clips 9-10, corresponding to selecting five video clips. In a second configuration, the server(s) 112 may group the video clips 1840 as video clips 1-4, video clips 5-8 and video clips 9-10, corresponding to selecting four video clips. To determine how to group the video clips 1840 in order to increase the diversity between the selected video clips, the server(s) 112 may generate a cost trellis 1860.

To generate the cost trellis 1860, the server(s) 112 may determine a cost associated with the similarity scores in the similarity matrix 1850. For example, the server(s) 112 may determine a cost $w_{12}$ between video clip 1 and video clip 2, a cost $w_{13}$ between video clip 1 and video clip 3, a cost $w_{14}$ between video clip 1 and video clip 4 and so on until a cost $w_{910}$ between video clip 9 and video clip 10. The server(s) 112 may determine the costs based on individual similarity scores in the similarity matrix 1850. To group the video clips 1840 based on diversity and a number of video clips to select, the server(s) 112 may determine an optimal path between video clip 1 and video clip 10 in the cost trellis 1860. For example, the server(s) 112 may determine that a cost $w_{15}$ between video clip 1 and video clip 5 is lower than a cost $w_{16}$ between video clip 1 and video clip 6 as video clip 6 is not similar to video clips 1-4 (e.g., similarity score is below a threshold) but is similar to video clip 5 (e.g., similarity score is above the threshold).

To determine the optimal path, the server(s) 112 may use an optimization algorithm to minimize an overall cost associated with the video clips 1840. In some examples, the overall cost may be determined by summing individual costs from video clip 1 to video clip 10. As illustrated in FIG. 18B, for example, the optimized path 1862 may include cost $w_{15}$ between video clip 1 and video clip 5, cost $w_{59}$ between video clip 5 and video clip 9 and cost $w_{910}$ between video clip 9 and video clip 10. Based on the optimized path 1862, the server(s) 112 may determine transition points 1870, which include a first transition point at video clip 1 (beginning of the video clips 1840), a second transition point at video clip 5 (separating video clip 4 and video clip 5), a third transition point at video clip 9 (separating video clip 8 and video clip 9) and a fourth transition point at video clip 10 (end of the video clips 1840). Thus, the server(s) 112 may group video clips 1-4, video clips 5-8 and video clips 9-10.

The server(s) 112 may determine a total number of transition points based on a length of the video data, a size of the similarity matrix 1850, a computational budget available on the server(s) 112 or the like. If there were additional transition points available, the server(s) 112 may determine an additional transition point at video clip 2 (separating video clip 1 and video clip 2) and/or video clip 9 (separating video clip 9 from video clip 10). However, the similarity score between video clips 1-2 and 9-10 are relatively high and the server(s) 112 may simplify the optimized path 1862 by removing the additional transition points.

After grouping the video clips 1840 based on diversity (e.g., Group 1 including video clips 1-4, Group 2 video clips 5-8 and Group 3 including video clips 9-10), the sever(s) 112 may select a single video clip from each group. For example, the server(s) 112 may determine that video clip 3 has the highest priority metric from Group 1, that video clip 6 has the highest priority metric from Group 2 and that video clip 9 has a higher priority metric than video clip 10. Therefore, the server(s) 112 may select video clips 3, 6 and 9 as both being interesting and increasing a diversity between the video clips. However, the present disclosure is not limited to selecting a single video clip from each group of video clips. Instead, the server(s) 112 may select n most diverse clips, which may include one or more video clips from each of the groups determined using the transition points 1870.

FIG. 19 is a flowchart conceptually illustrating an example method for determining virtual camera motion according to embodiments of the present disclosure. As illustrated in FIG. 19, the server(s) 112 may determine (1910) a first video frame, determine (1912) first pixel coordinates associated with objects represented in the first video frame and determine (1914) a first cropped window including the first pixel coordinates. The server(s) 112 may determine (1916) a second video frame, determine (1918) second pixel coordinates associated with objects represented in the second video frame and may determine (1920) a second cropped window including the second pixel coordinates.

The server(s) 112 may determine (1922) a panning effect, determine (1924) a zooming effect and determine (1926) virtual camera motion simulating panning/zooming using the panning effect and/or the zooming effect. As an example of panning, the server(s) 112 may select a first size for the first cropped window and the second cropped window and may pan between a first position (relative to the panoramic video data) of the first cropped window to a second position of the second cropped window. As an example of zooming, the server(s) 112 may select a first position for the first cropped window and the second cropped window and may zoom between a first size of the first cropped window to a second size of the second cropped window. As an example of both panning and zooming, the server(s) 112 may select a first position and a first size for the first cropped window and a second position and a second size for the second cropped window and may both pan and zoom between the first cropped window and the second cropped window. Therefore, the server(s) 112 may determine a region of interest within the video data and may generate virtual camera motion based on the annotation data.

While FIG. 19 illustrates a simple example of panning/zooming between a first video frame and a second video frame, the disclosure is not limited thereto. Instead, the server(s) 112 may determine multiple pixel coordinates and/or panning/zooming effects for an individual video clip. For example, the server(s) 112 may track object(s) throughout the video clip and may determine the pixel coordinates associated with the object(s) at regular intervals throughout the video clip. By tracking the object(s) and determining the pixel coordinates at regular intervals (e.g., keyframes), the server(s) 112 may interpolate or otherwise smooth between the pixel coordinates associated with the keyframes using multiple techniques. Therefore, instead of determining a beginning cropped window and an ending cropped window associated with the video clip, the server(s) 112 may determine multiple cropped windows (e.g., regions of interest) throughout the video clip and may determine panning/zooming based on the multiple cropped windows.

FIG. 20 illustrates a block diagram conceptually illustrating example components of a system 100 including one or more of a device 102, an image capture device 110 and/or a server(s) 112. Depending upon how the system is structured, some of the components illustrated in FIG. 20 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 2008 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 20, the device 102/image capture device 110/server(s) 112 may include an address/data bus 2002 for conveying data among components of the device 102/image capture device 110/server(s) 112. Each component within the device 102/image capture device 110/server(s) 112 may also be directly connected to other components in addition to (or instead of) being connected to other components across the bus 2002.

The device 102/image capture device 110/server(s) 112 may include one or more controllers/processors 2004 comprising one-or-more central processing units (CPUs) for processing data and computer-readable instructions and a memory 2006 for storing data and instructions. The memory 2006 may include volatile random access memory (RAM), non-volatile read only memory (ROM), non-volatile magnetoresistive (MRAM) and/or other types of memory. The device 102/image capture device 110/server(s) 112 may also include a data storage component 2008 for storing data and processor-executable instructions. The data storage component 2008 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 2010.

The device 102/image capture device 110/server(s) 112 includes input/output device interfaces 2010. A variety of components may be connected to the device 102/image capture device 110/server(s) 112 through the input/output device interfaces 2010, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure. In some examples, the image capture device 110 may include an inertial measurement unit (IMU), gyroscope, accelerometers or other component configured to provide motion data or the like associated with the image capture device 110.

The input/output device interfaces 2010 may be configured to operate with a network 2020, for example a wireless local area network (WLAN) (such as WiFi), Bluetooth, ZigBee and/or wireless networks, such as a Long Term Evolution (LTE) network, WiMAX network, 3G network, etc. The network 2020 may include a local or private network or may include a wide network such as the internet.

Devices may be connected to the network 2020 through either wired or wireless connections.

The input/output device interfaces 2010 may also include an interface for an external peripheral device connection such as universal serial bus (USB), FireWire, Thunderbolt, Ethernet port or other connection protocol that may connect to networks 2020. The input/output device interfaces 2010 may also include a connection to an antenna (not shown) to connect one or more networks 2020 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/image capture device 110/server(s) 112 further includes a video processing module 2024, which may comprise processor-executable instructions stored in storage 2008 to be executed by controller(s)/processor(s) 2004 (e.g., software, firmware), hardware, or some combination thereof. For example, components of the video processing module 2024 may be part of a software application running in the foreground and/or background on the device 102/image capture device 110/server(s) 112. The video processing module 2024 may control the device 102/image capture device 110/server(s) 112 as discussed above, for example with regard to FIGS. 1, 17, 18 and/or 19. Some or all of the controllers/modules of the video processing module 2024 may be executable instructions that may be embedded in hardware or firmware in addition to, or instead of, software. In one embodiment, the device 102/image capture device 110/server(s) 112 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/image capture device 110/server(s) 112 and its various components may be executed by the controller(s)/processor(s) 2004, using the memory 2006 as temporary "working" storage at runtime. The executable instructions may be stored in a non-transitory manner in non-volatile memory 2006, storage 2008, or an external device. Alternatively, some or all of the executable instructions may be embedded in hardware or firmware in addition to or instead of software.

The components of the device(s) 102/image capture device 110/server(s) 112, as illustrated in FIG. 20, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 21:
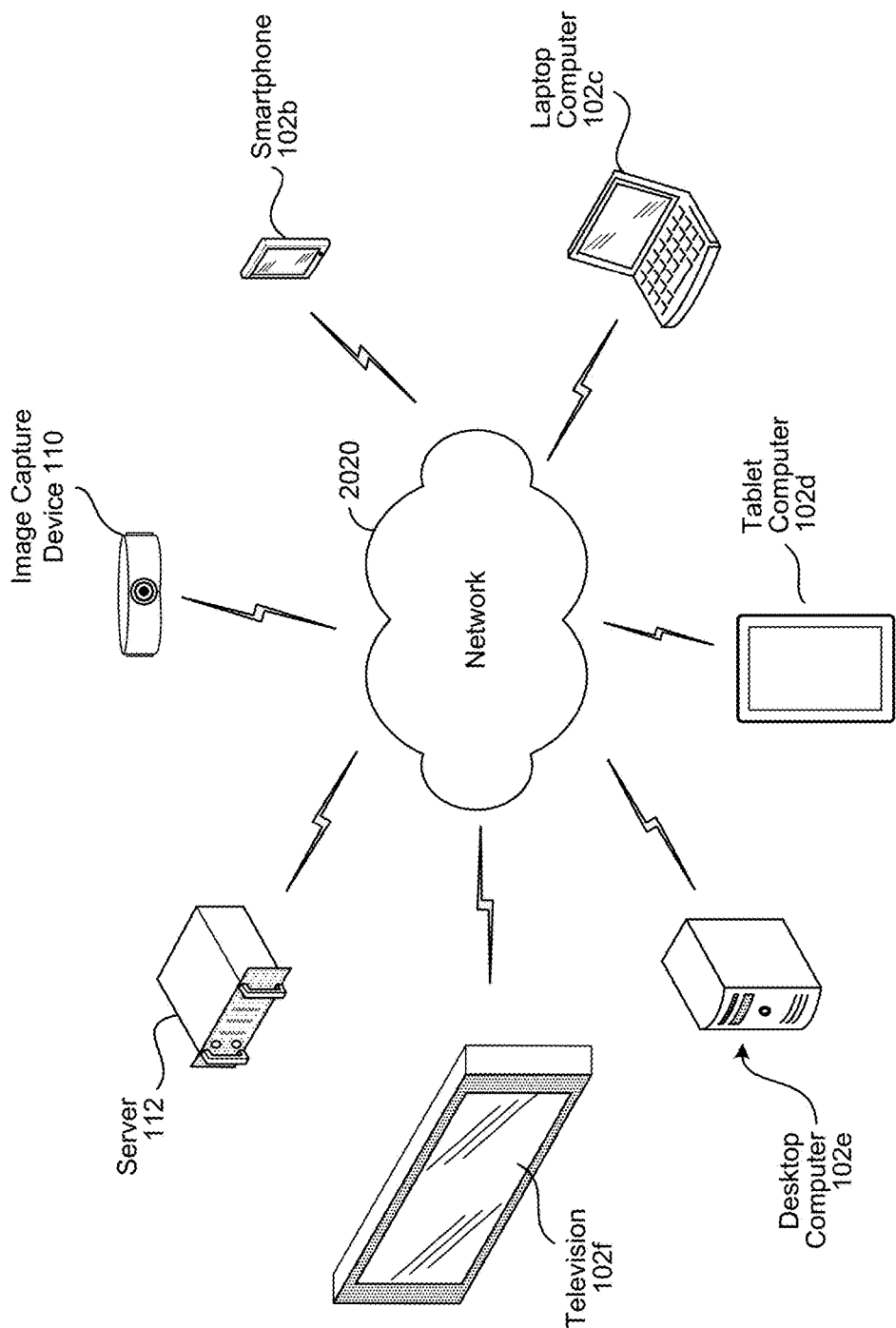
FIG. 21 illustrates an example of a computer network for use with the system.

As shown in FIG. 21, multiple devices may be connected over a network 2020. The network 2020 may include a local or private network or may include a wide network such as the internet. Devices may be connected to the network 2020 through either wired or wireless connections. For example, a smart phone 102b may be connected to the network 2020 through a wireless service provider. Other devices, such as an image capture device 110, laptop computer 102c, tablet computer 102d, desktop computer 102e, television 102f, and/or server(s) 112, may connect to the network 2020 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 17, 18 and/or 19. Alternatively, the server(s) 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for selecting a theme, the method comprising:
    receiving panoramic video data comprising panoramic video frames having a first aspect ratio greater than 2:1;
    receiving annotation data associated with the panoramic video data;
    selecting, using the annotation data, a first face represented in the panoramic video data;
    determining, using the annotation data, first pixel coordinates that corresponds to a position of the first face represented in a first video frame of the panoramic video data;
    determining, using the annotation data, second pixel coordinates that corresponds to a position of the first face represented in a second video frame of the panoramic video data;
    selecting, using the annotation data, a second face represented in the panoramic video data;
    determining, using the annotation data, third pixel coordinates that corresponds to a position of the second face represented in the first video frame;
    determining, using the annotation data, fourth pixel coordinates that corresponds to a position of the second face represented in the second video frame;
    determining, using the annotation data, a first priority metric that corresponds to a first measure of interest associated with the first video frame, the determining further comprising:
        determining that the first face is represented in the first video frame,
        determining that the second face is represented in the first video frame,
        determining that a distance between the first pixel coordinates and the third pixel coordinates is below a first threshold, and
        determining a color histogram using the first video frame,
        determining an image quality score using the color histogram, and
        determining that the image quality score is above a second threshold;
    determining that the first priority metric is above a third threshold;
    determining, using the annotation data, a second priority metric that corresponds to a second measure of interest associated with the second video frame;
    determining that the second priority metric is above the third threshold;
    selecting first video frames that begin with the first video frame, end with the second video frame and include all video frames having a time stamp after a first time stamp of the first video frame and before a second time stamp of the second video frame;
    determining a first region of interest in the first video frame that includes the first pixel coordinates and the third pixel coordinates;
    determining a second region of interest in the second video frame that includes the second pixel coordinates and the fourth pixel coordinates; and
    generating output video data that has a second aspect ratio less than 2:1 and includes portions of the first video frames including the first region of interest and the second region of interest.

2. The computer-implemented method of claim 1, further comprising:
    determining a first cropped window from the first video frame, the first cropped window comprising a portion of the first video frame including the first pixel coordinates and the third pixel coordinates, wherein the first cropped window:
        has the second aspect ratio,
        has a first size, and
        is located at a first position within the first video frame;
    determining a second cropped window from the second video frame, the second cropped window comprising a portion of the second video frame including the second pixel coordinates and the fourth pixel coordinates, wherein the second cropped window:
        has the second aspect ratio,
        has a second size different from the first size, and
        is located at a second position within the second video frame; and
    generating the output video data including the first cropped window and the second cropped window, wherein the output video data represents at least one of:
        panning from the first cropped window to the second cropped window, or
        zooming from the first cropped window to the second cropped window.

3. The computer-implemented method of claim 1, further comprising:
    determining, using the annotation data, a third priority metric that corresponds to a third measure of interest in a third video frame;
    determining that the third priority metric is above the third threshold;
    determining, using the annotation data, a fourth priority metric that corresponds to a fourth measure of interest in a fourth video frame;
    determining that the fourth priority metric is above the third threshold;
    selecting second video frames that begin with the third video frame, end with the fourth video frame and include all video frames having a time stamp after a third time stamp of the third video frame and a fourth time stamp of the fourth video frame;

determining, using the annotation data, a first similarity score that corresponds to a similarity between the first video frames and the second video frames;

determining that the first similarity score is below a fourth threshold; and generating second output video data that has the second aspect ratio and includes the second video frames.

4. The computer-implemented method of claim 1, further comprising:

determining, using the annotation data, an overall priority metric for the output video data;

determining, using the annotation data, a first similarity score that corresponds to a similarity between the first video frame and the second video frame;

identifying, using the first similarity score, a first transition point within the output video data;

determining a video fingerprint associated with the output video data that indicates characteristics of the output video data; and updating a table to include entries associated with the output video data, the table indicating the first video frames, the overall priority metric, the first transition point, the video fingerprint, the first pixel coordinates associated with the first face in the first video frame and the second pixel coordinates associated with the first face in the second video frame.

5. A computer-implemented method, comprising:

receiving input video data that has a first aspect ratio greater than 2:1;

receiving annotation data associated with the input video data;

determining, using the annotation data, a plurality of pixel coordinates associated with a first object represented in the input video data;

determining, using the annotation data, a first priority metric that corresponds to a first measure of interest associated with a first video frame of the input video data;

determining that the first priority metric is above a threshold;

selecting the first video frame that corresponds to the first priority metric;

determining a first region of interest in the first video frame based on the plurality of pixel coordinates; and generating output video data that has a second aspect ratio less than 2:1 and includes the first region of interest in the first video frame.

6. The computer-implemented method of claim 5, further comprising:

determining first pixel coordinates associated with the first object in the first video frame;

determining a first cropped window from the first video frame, the first cropped window comprising a portion of the first video frame including the first pixel coordinates, wherein the first cropped window:
  has a second aspect ratio that is less than 2:1, and
  has a first size and a first position within the first video frame;

determining second pixel coordinates associated with the first object in a second video frame of the first video frames;

determining a second cropped window from the second video frame, the second cropped window comprising a portion of the second video frame including the second pixel coordinates, wherein the second cropped window:
  has the second aspect ratio, and
  has a second size and a second position within the second video frame; and generating the output video data including the first cropped window and the second cropped window, wherein the output video data represents at least one of:
  panning from the first cropped window to the second cropped window, or
  zooming from the first cropped window to the second cropped window.

7. The computer-implemented method of claim 5, further comprising:

determining that the output video data includes a first plurality of video frames of the input video data;

determining that a second priority metric that corresponds to a second measure of interest associated with a second video frame of the input video data is above the threshold;

selecting a second plurality of video frames of the input video data including the second video frame;

determining a first combined priority metric associated with the first plurality of video frames;

determining a second combined priority metric associated with the second plurality of video frames; and determining that the first combined priority metric is larger than the second combined priority metric.

8. The computer-implemented method of claim 7, further comprising:

determining, based on the annotation data, a first similarity score that corresponds to a first similarity between the first plurality of video frames and the second plurality of video frames;

determining that the first similarity score is below a second threshold;

determining a second region of interest in the second video frame; and generating second output video data that has the second aspect ratio and includes portions of the second plurality of video frames including the second region of interest.

9. The computer-implemented method of claim 7, further comprising:

determining, based on the annotation data, a first similarity score that corresponds to a first similarity between the first plurality of video frames and the second plurality of video frames;

determining that the first similarity score is above a second threshold; and determining not to select the second plurality of video frames.

10. The computer-implemented method of claim 5, further comprising:

receiving input increasing a priority associated with a first characteristic in the annotation data;

determining, based on the input, second weights associated with the annotation data;

determining, using the annotation data and the second weights, a second priority metric that corresponds to a second measure of interest associated with the first video frame;

determining that the second priority metric is above the threshold; and selecting the first video frame.

11. The computer-implemented method of claim 5, further comprising:

determining first pixel coordinates associated with the first object at a first timestamp;

determining second pixel coordinates associated with the first object at a second timestamp;

generating a first entry in a table that indicates the first pixel coordinates associated with the first object at the first timestamp; and generating a second entry in the table that indicates the second pixel coordinates associated with the first object at the second timestamp.

12. The computer-implemented method of claim 5, further comprising:

determining, using the annotation data, an overall priority metric for the output video data;

determining, based on the annotation data, a first similarity score between the first video frame and a second video frame;

identifying, using the first similarity score, a first transition within the output video data;

determining a video fingerprint associated with the output video data, the video fingerprint indicating characteristics of the output video data; and generating entries in a table that indicate the first video frames, the overall priority metric, the first transitions, and the video fingerprint.

13. A device, comprising:

at least one processor; and a memory device including instructions operable to be executed by the at least one processor to configure the device to:

receive input video data that has a first aspect ratio greater than 2:1;

receive annotation data associated with the input video data;

determine, using the annotation data, a plurality of pixel coordinates associated with a first object represented in the input video data;

determine, using the annotation data, a first priority metric that corresponds to a first measure of interest associated with a first video frame of the input video data;

determine that the first priority metric is above a threshold;

select the first video frame that corresponds to the first priority metric;

determine a first region of interest in the first video frame based on the plurality of pixel coordinates; and generate output video data that has a second aspect ratio less than 2:1 and includes the first region of interest in the first video frame.

14. The device of claim 13, wherein the instructions further configure the system to:

determine first pixel coordinates associated with the first object in the first video frame;

determine a first cropped window from the first video frame, the first cropped window comprising a portion of the first video frame including the first pixel coordinates, wherein the first cropped window:

has a second aspect ratio less than 2:1, and has a first size and a first position within the first video frame;

determine second pixel coordinates associated with the first object in a second video frame of the first video frames;

determine a second cropped window from the second video frame, the second cropped window comprising a portion of the second video frame including the second pixel coordinates, wherein the second cropped window:

has the second aspect ratio, and has a second size and a second position within the second video frame; and generate the output video data including the first cropped window and the second cropped window, wherein the output video data represents at least one of:

panning from the first cropped window to the second cropped window, or zooming from the first cropped window to the second cropped window.

15. The device of claim 13, wherein the instructions further configure the system to:

determine that the output video data includes a first plurality of video frames of the input video data;

determine that a second priority metric that corresponds to a second measure of interest associated with a second video frame of the input video data is above the threshold;

select a second plurality of video frames of the input video data including the second video frame;

determine a first combined priority metric associated with the first plurality of video frames;

determine a second combined priority metric associated with the second plurality of video frames; and determine that the first combined priority metric is larger than the second combined priority metric.

16. The device of claim 15, wherein the instructions further configure the system to:

determine, based on the annotation data, a first similarity score that corresponds to a first similarity between the first plurality of video frames and the second plurality of video frames;

determine that the first similarity score is below a second threshold;

determine a second region of interest in the second video frame; and generate second output video data that has the second aspect ratio and includes portions of the second plurality of video frames including the second region of interest.

17. The device of claim 15, wherein the instructions further configure the system to:

determine, based on the annotation data, a first similarity score that corresponds to a first similarity between the first plurality of video frames and the second plurality of video frames;

determine that the first similarity score is above a second threshold; and determine not to select the second plurality of video frames.

18. The device of claim 13, wherein the instructions further configure the system to:

receive input increasing a priority associated with a first characteristic in the annotation data;

determine, based on the input, second weights associated with the annotation data;

determine, using the annotation data and the second weights, a second priority metric that corresponds to a second measure of interest associated with the first video frame;

determine that the second priority metric is above the threshold; and select the first video frame.

19. The device of claim 13, wherein the instructions further configure the system to:

determine first pixel coordinates associated with the first object at a first timestamp;

determine second pixel coordinates associated with the first object at a second timestamp;

generate a first entry in a table that indicates the first pixel coordinates associated with the first object at the first timestamp; and generate a second entry in the table that indicates the second pixel coordinates associated with the first object at the second timestamp.

20. The device of claim 13, wherein the instructions further configure the system to:

determine, using the annotation data, an overall priority metric for the output video data;

determine, based on the annotation data, a first similarity score between the first video frame and a second video frame;

identify, using the first similarity score, a first transition within the output video data;

determine a video fingerprint associated with the output video data, the video fingerprint indicating characteristics of the output video data; and generating entries in a table that indicate the first video frames, the overall priority metric, the first transitions, and the video fingerprint.

\* \* \* \* \*